(12) United States Patent
Liu et al.

(10) Patent No.: US 12,038,125 B2
(45) Date of Patent: Jul. 16, 2024

(54) CALIBRATION SYSTEM AND CALIBRATION BRACKET THEREOF

(71) Applicant: AUTEL INTELLIGENT TECHNOLOGY CORP., LTD., Guangdong (CN)

(72) Inventors: Lianjun Liu, Guangdong (CN); Kaikai Zhang, Guangdong (CN)

(73) Assignee: AUTEL INTELLIGENT TECHNOLOGY CORP., LTD., Guangdong (CN)

( * ) Notice: Subject to any disclaimer, the term of this patent is extended or adjusted under 35 U.S.C. 154(b) by 105 days.

(21) Appl. No.: 17/929,367

(22) Filed: Sep. 2, 2022

(65) Prior Publication Data

US 2022/0412504 A1 Dec. 29, 2022

Related U.S. Application Data

(63) Continuation of application No. PCT/CN2021/081151, filed on Mar. 16, 2021.

(30) Foreign Application Priority Data

Mar. 23, 2020 (CN) .......................... 202010209643.2

(51) Int. Cl.
  *F16M 11/20* (2006.01)
(52) U.S. Cl.
  CPC .............................. *F16M 11/2014* (2013.01)
(58) Field of Classification Search
  CPC .................................................. F16M 11/2014
  See application file for complete search history.

(56) References Cited

U.S. PATENT DOCUMENTS

| | | |
|---|---|---|
| 5,385,323 A | 1/1995 | Garelick |
| 7,690,317 B2 | 4/2010 | Beck et al. |

(Continued)

FOREIGN PATENT DOCUMENTS

| | | |
|---|---|---|
| CN | 202598054 U | 12/2012 |
| CN | 205191112 U | 4/2016 |

(Continued)

OTHER PUBLICATIONS

The Extended European Search Report dated Jul. 27, 2023; Appln. No. 21776673.2.

(Continued)

*Primary Examiner* — Anita M King
(74) *Attorney, Agent, or Firm* — Frank Gao, Esq.

(57) ABSTRACT

A calibration system and a calibration bracket thereof. The calibration bracket includes: a base; a fixed vertical rod, one end of the fixed vertical rod being mounted on the base; a movable vertical rod, mounted on the fixed vertical rod, and being able to move relative to the fixed vertical rod along a length direction of the fixed vertical rod; a brake member, configured to provide a friction force for driving the movable vertical rod to be fixed relative to the fixed vertical rod along the length direction of the fixed vertical rod; and a hanging member, mounted on the movable vertical rod, the hanging member being used for hanging a calibration element, the calibration element being used for calibrating an advanced driver assistance system of a vehicle.

19 Claims, 21 Drawing Sheets

(56) References Cited

U.S. PATENT DOCUMENTS

| | | | | |
|---|---|---|---|---|
| 10,323,936 B2 * | 6/2019 | Leikert | ............... | G01B 11/2755 |
| 10,821,607 B2 * | 11/2020 | Chen | ........................ | B66F 9/24 |
| 11,119,189 B2 * | 9/2021 | Lai | ...................... | G01M 17/007 |
| 11,154,980 B2 * | 10/2021 | Wang | ....................... | B25H 5/00 |
| 11,782,125 B2 * | 10/2023 | Lai | ......................... | F16M 11/38 |
| | | | | 33/299 |
| 2020/0271267 A1 * | 8/2020 | Govekar | ................. | G01B 11/00 |

FOREIGN PATENT DOCUMENTS

| | | |
|---|---|---|
| CN | 205655046 U | 10/2016 |
| CN | 208764594 U | 4/2019 |
| CN | 210036786 U | 2/2020 |
| CN | 210036787 U | 2/2020 |
| CN | 210129117 U | 3/2020 |
| CN | 111288261 A | 6/2020 |
| CN | 212691246 U | 3/2021 |

OTHER PUBLICATIONS

International Search Report; mailed Jun. 4, 2021; PCT/CN2021/081151.

* cited by examiner

CALIBRATION SYSTEM AND CALIBRATION BRACKET THEREOF

CROSS REFERENCE TO RELATED APPLICATION

The present application is continuation application of International Application No. PCT/CN2021/081151, filed on Mar. 16, 2021, which claims the priority to the Chinese patent application No. 202010209643.2 filed on Mar. 23, 2020, the entire contents of which are incorporated herein by reference in its entirety.

TECHNICAL FIELD

The present application relates to the technical field of vehicle maintenance and equipment calibration, and in particular to a calibration system and a calibration bracket thereof.

BACKGROUND

An advanced driver assistant system, referred to as ADAS, is an active safety technology to use a variety of sensors mounted on a vehicle to collect environmental data inside and outside the vehicle immediately, and perform technical processing such as the identification, detection, and tracking of static and dynamic objects, so as to enable a driver to detect a possible danger at the fastest time, thereby drawing attention and improving the safety. ADAS uses sensors such as cameras, radars, lasers, ultrasonic waves, etc. to detect light, heat, pressure, or other variables used to monitor the condition of the vehicle. The sensors are typically on the front and rear bumpers, side-view mirrors, the inside of a steering column, or a windshield. During the use of the vehicle, vibrations, collisions, ambient temperature and humidity, etc. may change the physical mounting state of the above-mentioned sensors so that an adjustment or a calibration needs to be performed irregularly. When adjusting or calibrating such sensors, calibration elements are typically mounted on a cross beam of the calibration bracket to adjust or calibrate the sensors on the vehicle. However, for most of the current calibration brackets, after a calibration element is mounted on the cross beam, the cross beam is unstable and easy to fall.

SUMMARY

Embodiments of the present application are intended to provide a calibration system and a calibration bracket thereof to solve the problem of instability of a cross beam of a calibration bracket after mounting a calibration element according to the prior art.

In one aspect, a calibration bracket is provided, comprising: a base; a fixed vertical rod, one end of the fixed vertical rod being mounted on the base; a movable vertical rod, mounted on the fixed vertical rod, and being able to move relative to the fixed vertical rod along a length direction of the fixed vertical rod; a brake member, configured to provide a friction force for driving the movable vertical rod to be fixed relative to the fixed vertical rod along the length direction of the fixed vertical rod; a cross beam mounted to the movable vertical rod, when the movable vertical rod moves along the length direction of the fixed vertical rod relative to the fixed vertical rod, the cross beam is driven to move together; and one or more hanging members, mounted on the cross beam or the movable vertical rod, each of the hanging members being used for hanging a calibration element, the calibration element being used for calibrating an advanced driver assistance system of a vehicle.

In another aspect, there is provided a calibration system comprising a calibration element and the calibration bracket as described above, the calibration element being mountable to the calibration bracket.

In comparison with the prior art, in the calibration bracket of the present embodiment, a brake member is configured. The brake member provides a friction forced for driving the fixed vertical rod to be fixed relative to the fixed vertical rod along the length direction of the fixed vertical rod so that the cross beam can be stable after mounting the calibration element.

BRIEF DESCRIPTION OF THE DRAWINGS

One or more embodiments are illustrated by way of examples with a figure in the corresponding drawings. The illustrative examples are not to be construed as limiting the embodiments. In the drawings, elements having the same reference numeral designations represent like elements, and unless otherwise specified, the drawings are not to scale.

DETAILED DESCRIPTION

Figure 1:
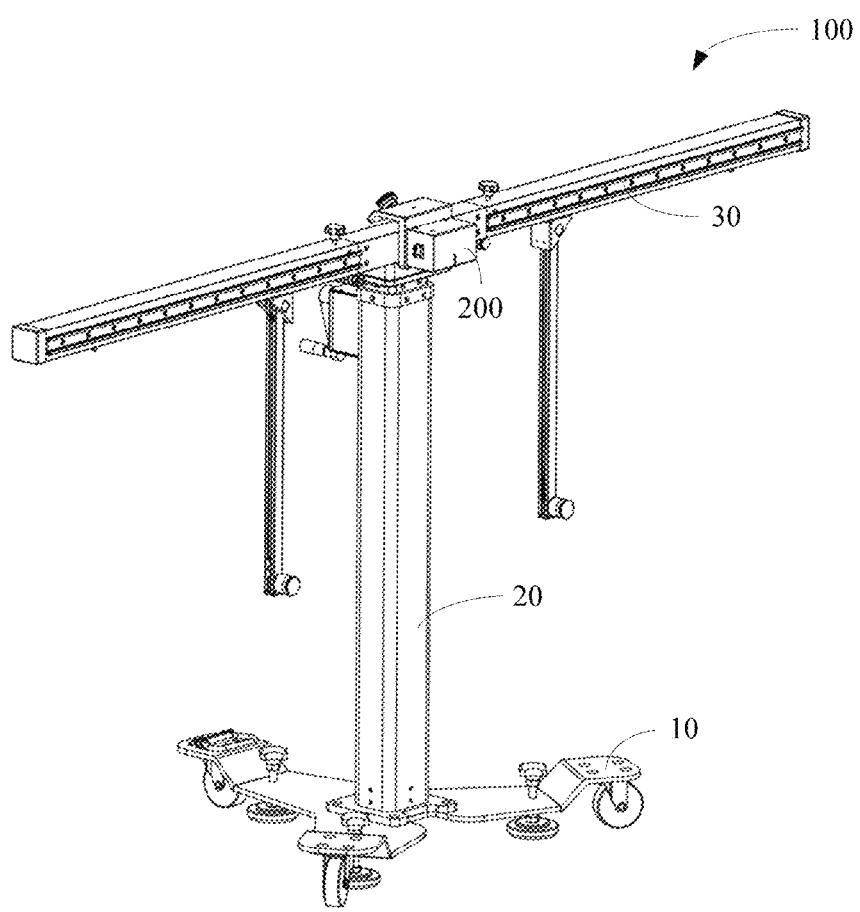
FIG. 1 is a stereogram of a calibration bracket according to an embodiment of the present application, wherein the calibration bracket is mounted with a multi-line laser.

In order that the present application may be readily understood, a more particular description of the application will be rendered by reference to specific embodiments and the accompanying drawings. It needs to be noted that when an element is referred to as being "fixed" to another element, it can be directly on the other element or one or more intermediate elements may be present between the elements. When one element is referred to as being "connected" to another element, it can be directly connected to the other element or one or more intermediate elements may be present between the elements. As used herein, orientational or positional relationships indicated by the terms "upper", "lower", "inner", "outer", "vertical", "horizontal", and the like are based on the orientational or positional relationships shown in the drawings, and are merely for the convenience in describing and simplifying the present application, and do not indicate or imply that the referenced devices or elements must have a particular orientation, be constructed and operated in a particular orientation, and thus are not to be construed as limiting the present application. Furthermore, the terms "first", "second", and the like are used for descriptive purposes only and are not to be construed as indicating or implying relative importance.

Unless defined otherwise, all technical and scientific terms used in the description have the same meaning as commonly understood by one of ordinary skill in the art to which this application belongs. The terms used in the description of the present application are for the purpose of describing specific embodiments only and are not intended to be limiting of the present application. As used in the description, the term "and/or" includes any and all combinations of one or more of the associated listed items.

Furthermore, the technical features involved in various embodiments of the present application described below can be combined as long as they do not conflict with each other.

Figure 2:
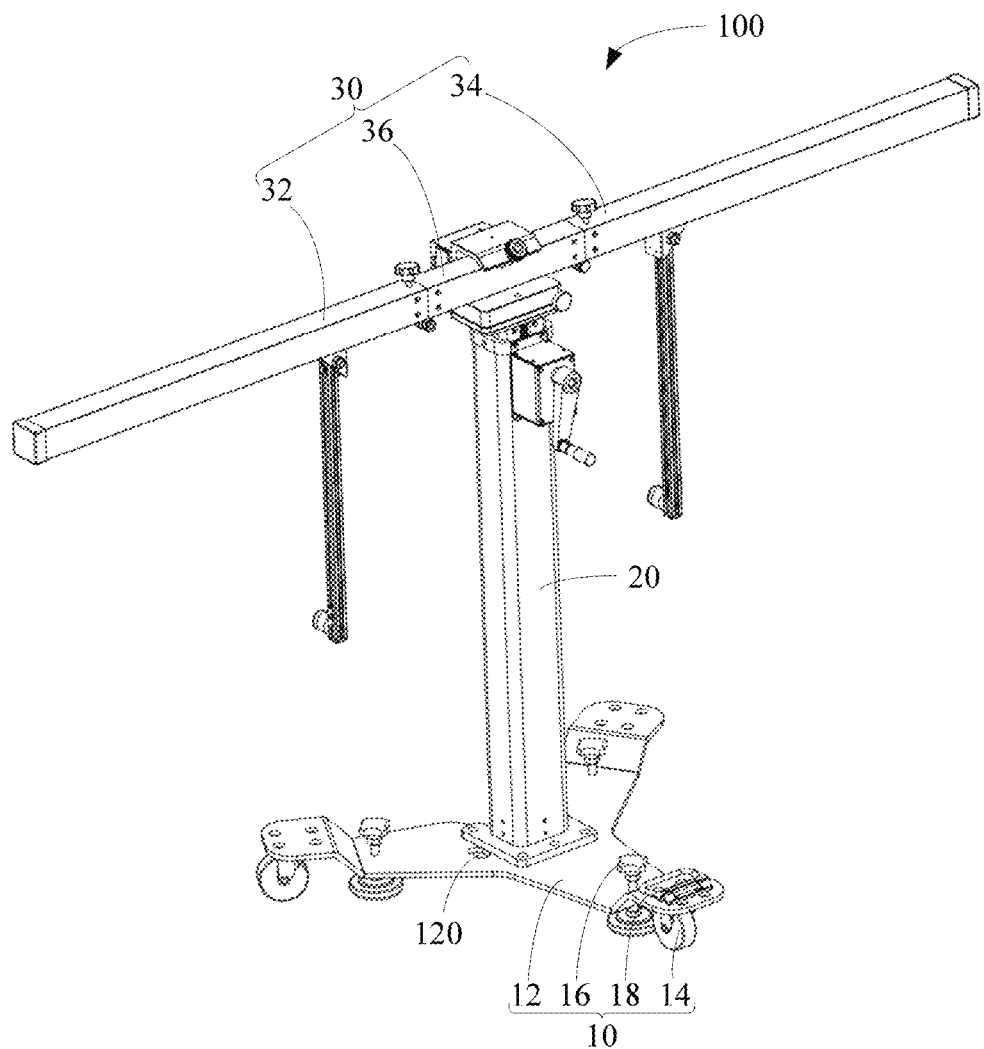
FIG. 2 is a stereogram of another angle of the calibration bracket shown in FIG. 1.
Figure 3:
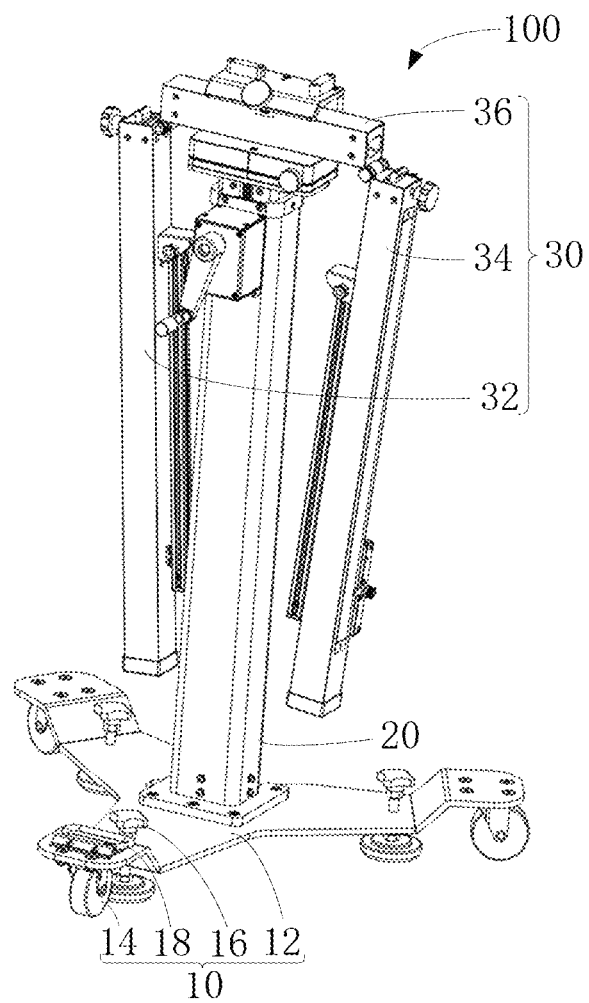
FIG. 3 is a stereogram of the calibration bracket shown in FIG. 1 with a cross beam assembly of the calibration bracket in a folded state.

Referring to FIGS. 1, 2, and 3 together, one embodiment of the present application provides a calibration bracket 100. The calibration bracket 100 comprises a base 10, a vertical frame assembly 20 fixedly connected to the base 10, and a cross beam assembly 30 comprising a first cross beam portion 32, a second cross beam portion 34, and a connecting portion 36. The connecting portion 36 is mounted to the vertical frame assembly 20, one end of the connecting portion 36 is hinged to the first cross beam portion 32 and the other end of the connecting portion 36 is hinged to the second cross beam portion 34. The first cross beam portion 32 and the second cross beam portion 34 are respectively rotatable toward each other relative to the connecting portion 36 to fold the cross beam assembly 30. The first cross beam portion 32 and the second cross beam portion 34 are respectively rotatable away from each other relative to the connecting portion 36 to unfold the cross beam assembly 30.

"Mounting" includes fixed mounting such as welded mounting, and also includes detachable mounting.

The cross beam assembly 30 may be used for mounting a calibration element, such as a multi-line laser 200, a calibration target, a radar reflecting or absorbing device, etc. to calibrate an on-board auxiliary driving system.

In the calibration bracket 100 of the present embodiment, the first cross beam portion 32 and the second cross beam portion 34 are pivotally rotatable relative to the connecting portion 36, respectively. So that the cross beam assembly 30 is folded, thereby reducing the volume of the calibration bracket 100 to facilitate shipping.

The first cross beam portion 32, the second cross beam portion 34, and the connecting portion 36 constitute a cross beam.

Alternatively, the cross beam assembly 30 is mounted on the top surface of the movable vertical rod 24. This allows the center of gravity of the cross beam assembly 30 to be closer to the center of gravity of the movable vertical rod 24 compared with the conventional calibration frame so that the stability of the calibration frame can be increased and the use of a base with a smaller area can be used.

Alternatively, the first cross beam portion 32 and the second cross beam portion 34 may be rotated toward each other relative to the connecting portion 36. For example, they may be folded downward together, or folded upward, forward, or backward together. Alternatively, when the first cross beam portion 32 and the second cross beam portion 34 are folded downward, the length of the connecting portion 36 may be relatively short, and the first cross beam portion 32 and the second cross beam portion 34 may be in a drooping state, so that the cross beam assembly 30 may not need to be removed from the vertical frame assembly 20, and the space occupied by the calibration bracket 100 may be significantly reduced, making it easy for transportation means to carry. When the first cross beam portion 32 and the second cross beam portion 34 are folded upwards, forwards, and backward, a device for rotating the cross beams may be provided, so that the final folding direction of the first cross beam portion 32 and the second cross beam portion 34 is downwards, and the two may also be in a drooping state; alternatively, the length of the connecting portion 36 may be made relatively long, and the folded first cross beam portion 32 and second cross beam portion 34 may be placed to cling to the connecting portion 36 and secured thereto by a releasable fixing device. In the latter case, in order to further reduce the space occupied by the calibration bracket 100, the cross beam assembly 30 may be removed from the vertical frame assembly 20, carried to a place to be used, and then mounted on the vertical frame assembly 20.

Those skilled in the art could understand that the manner in which the cross beam assembly 30 is folded is not limited to the manner described above. For example, the cross beam may be folded into two sections, in which case there is no connecting portion 36; the cross beam may also be folded into four or more sections. However, three sections are preferable. Because this makes the middle section of the cross beam have no fracture so that the cross beam can be stably and evenly fixed to the vertical rod by using only one fastening component in the middle section.

The base 10 includes a base body 12, a roller 14, a height adjustment member 16, and a pull ring 18.

The base body 12 has a triangular claw shape, and includes three claws, each of the three claws extending in three different directions. The base body 12 may be made of a metallic material.

The roller 14 is mounted at the bottom surface of the base body 12, and the number of the rollers 14 may be three, and each of the rollers 14 is mounted at the end of one corresponding claw for facilitating the movement of the base body 12. In the present embodiment, the roller 14 is a universal moving roller so that the base body 12 can move back and forth, and left and right randomly.

The height adjustment member 16 is mounted to the base body 12 for adjusting the height of the base body 12. In the present embodiment, the height adjustment member 16 is an adjusting knob, the number of which is three. At least one section of a spiral rod is included below the knob, and the spiral rod cooperates with the thread of the through hole at the base to realize height adjustment. Each height adjustment member 16 is mounted to one corresponding claw and close to one corresponding roller 14. Three height adjustment members 16 are a regular triangular distribution.

The pull ring 18 may be mounted to an upper surface of one of the claws for facilitating the pulling of the calibration bracket 100.

It will be understood that in some other embodiments, the shape of the base body 12 may vary according to actual needs and is not limited to a triangular claw shape. For example, the base body 12 may be rectangular or circular. The number of the rollers 14 and the height adjustment members 16 may be respectively increased or decreased according to actual requirements. For example, in the case of the base body 12 of a triangular claw shape, the height adjustment members can be two, and one stand bar with a fixed height is coordinated to adjust the angle of the base body 12.

Figure 4:
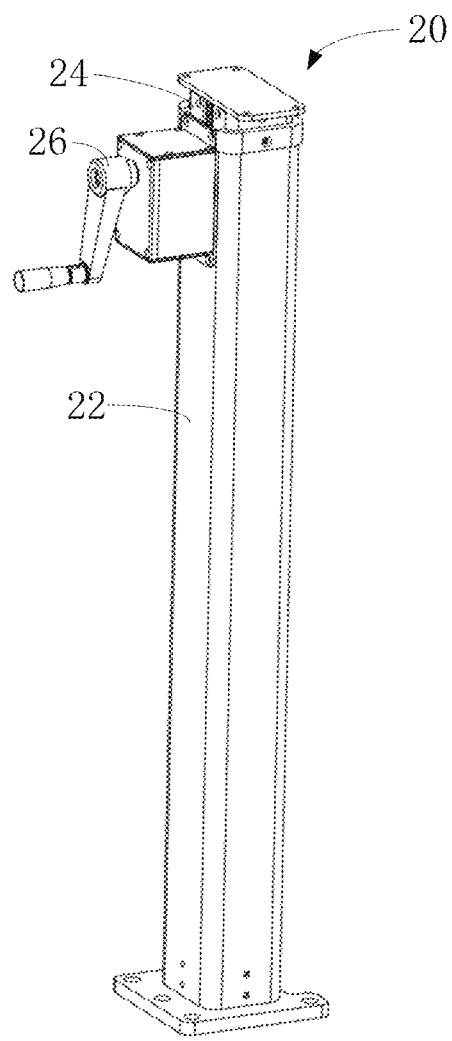
FIG. 4 is a stereogram of a vertical frame assembly of the calibration bracket shown in FIG. 1.
Figure 5:
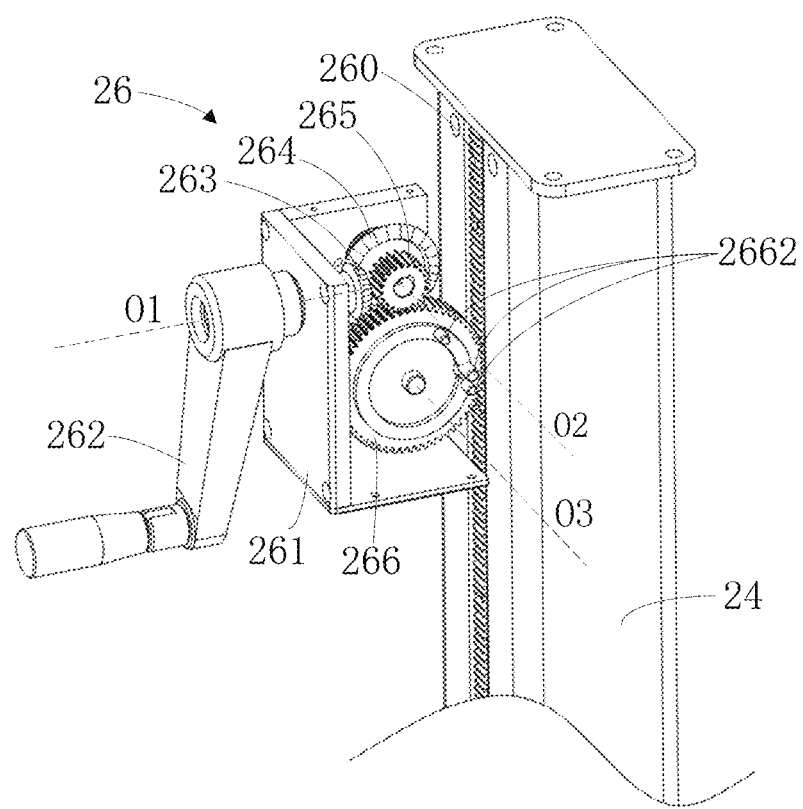
FIG. 5 is a stereogram of the vertical frame assembly shown in FIG. 4 with some elements omitted.

Referring to FIGS. 4 and 5 together, the vertical frame assembly 20 may include a fixed vertical rod 22, a movable vertical rod 24 sleeved within the fixed vertical rod 22, and a driving mechanism 26. The movable vertical rod 24 can move relative to the fixed vertical rod 22 along the length direction of the fixed vertical rod 22, and the driving mechanism 26 is mounted to the fixed vertical rod 22 for driving the movable vertical rod 24 to move relative to the fixed vertical rod 22 along the length direction of the fixed vertical rod 22. By sleeving and connecting the movable vertical rod 24 and the fixed vertical rod 22, the height of the vertical frame assembly 20 can be reduced to nearly half of the original height, and in cooperation with the folding of the cross rod assembly 30, the vertical frame assembly 20 can be very suitable for being carried in the rear box of transportation means such as an automobile.

It will be understood that a fixed vertical rod may serve as an inner rod and a movable vertical rod may serve as an outer rod as required. A driving mechanism 26 is mounted to the fixed vertical rod 22 for driving the movable vertical rod 24 to move relative to the fixed vertical rod 22 along the length direction of the fixed vertical rod 22.

Alternatively, the fixed vertical rod 22 and the movable vertical rod 24 are respectively square tubes, and the movable vertical rod 24 is closely sleeved in the fixed vertical rod 22 so that the movable vertical rod 24 can only move relative to the fixed vertical rod 22 along the length direction of the fixed vertical rod 22, and the movable vertical rod 24 can be prevented from moving relative to the fixed vertical rod 22 in other directions. This configuration is very important to achieve a foldable calibration bracket 100. Since it is often necessary to utilize a fixed relative positional relationship between the components of the calibration bracket 100 during the calibration, for example, it is possible to fix one laser on the outer surface of the fixed vertical rod 22. The laser is used to locate the vehicle's central axis, thereby determining the relative position between the target carried on the cross beam assembly 30, and the vehicle. Therefore, if there is a slight change in the relative position between the components, the calibration accuracy is affected, or an additional fine tuning mechanism needs to be added to compensate. If the relative position between the components varies considerably, it may also lead to the failure of additional fine tuning mechanisms. Therefore, relative movements, such as relative rotation, between the movable vertical rod 24 and the fixed vertical rod 22 other than in the length direction are to be excluded in a telescoping manner. A convenient way is that the movable vertical rod 24 and the fixed vertical rod 22 are square tubes so as to ensure that only relative movement in the length direction takes place between them.

It will be understood that in some other embodiments, the fixed vertical rod 22 and the movable vertical rod 24 may be tubing of other shapes, for example, cross-sections thereof being polygonal tubing that cooperate with each other, such that the movable vertical rod 24 can only move relative to the fixed vertical rod 22 along the length direction of the fixed vertical rod 22, and such that the movable vertical rod 24 is prevented from moving relative to the fixed vertical rod 22 in other directions. Here, the "cooperation with each other" does not necessarily require that the cross-sections of the fixed vertical rod 22 and the movable vertical rod 24 must be the same, for example, the case that the cross section of the fixed vertical rod 22 provided on the outside may be a hexagon, and the cross section of the movable vertical rod 24 provided on the inside may be a quadrilateral joining the hexagon. And the effect that the movable vertical rod 24 can move only along the length direction of the fixed vertical rod 22 relative to the fixed vertical rod 22 can also be achieved. The cross-sections of the fixed vertical rod 22 and the movable vertical rod 24 may also be cylindrical tubing of elliptical shape cooperating with each other, and the elliptical cross-section may also restrict the relative rotation between the two to some extent.

The fixed vertical rod 22 and the movable vertical rod 24 may each be cylindrical tubing having a circular cross section. At the time, the fixed vertical rod 22 may be prevented from rotating relative to the movable vertical rod 24 by a guide mechanism for guiding the movable vertical rod 24 to move stably relative to the fixed vertical rod 22, or a mechanism for detecting and adjusting the movement of the fixed vertical rod 22 relative to the movable vertical rod 24 other than along the length direction may be added to other components of the calibration bracket 100. A simple and convenient guiding mechanism is a guide rail and a sliding block device cooperating therewith. A guide rail can be provided on one of the fixed vertical rod 22 and the movable vertical rod 24 at the surface where the two are in contact with each other. A sliding block device such as a lug, a plastic adhesive tape, a roller, a ball, a gear, etc. can be provided on the other of the two. At the time, the sliding block device will be constrained to move on the guide rail and only relative movement along the length direction occurs between the two vertical rods can also be ensured. The guide rail can be a groove, a linear projection, a rack, etc. additionally provided on the tube wall of the vertical rod, or can be a groove, a linear projection, a groove formed between two linear projections, etc. formed on the tube wall itself of the vertical rod. Namely, the vertical rod uses a special-shaped tube wall, and the tube wall itself has a groove, a linear projection, etc. which can serve as a part used by the guide rail. Likewise, the sliding block device may be an additional component additionally provided on the tube wall of the vertical rod, or may be a projection structure formed by means of the tube wall itself of the vertical rod, without the need for an additional component at the tube wall of the vertical rod. In addition, a rack and other mechanisms that realize transmission through meshing, also have a guiding function per se, and this description also includes it in the scope of a guide rail. The guiding effect can also be achieved by a gear and rack transmission mechanism as described in the following embodiments. Alternatively, a rack may be provided in a groove guide rail.

It will be understood that the arranged positions of the guide rail and the sliding block device can be interchanged, either with the guide rail being arranged on the movable vertical rod and the sliding block device being arranged on the fixed vertical rod, or in the case that the positions can be interchanged.

It will be understood that the guide mechanism is not limited to a fixed vertical rod 22 and a movable vertical rod 24 having circular cross-sections, and a guide mechanism can also be used on the fixed vertical rod 22 and movable vertical rod 24 of other cross-sectional shapes to enhance the guiding effect and obtain a more stable relative motion or a relative motion with less friction force. For non-circular cross-sectional shapes, it is also possible to obtain a more stable relative motion or a relative motion with less friction force by only using a linear motion device without a guide rail, in which case the non-circular outer vertical rod itself plays the role of guiding.

The driving mechanism 26 includes a rack 260, a shell 261, a handle 262, and a gear reduction assembly. The gear reduction assembly includes a first helical gear 263, a second helical gear 264, a first transmission gear 265, and a second transmission gear 266.

The rack 260 is fixedly mounted to the movable vertical rod 24, and the rack 260 is provided along the length direction of the movable vertical rod 24. When the base 10 is placed on a horizontal plane, the fixed vertical rod 22, the movable vertical rod 24, and the rack 260 are all vertically provided.

The shell 261 is fixedly mounted to the fixed vertical rod 22.

The handle 262 is mounted to the shell 261, and the handle 262 is rotatable about a first rotation axis O1.

The gear reduction assembly can make the position movement of the movable vertical rod 24 more accurate and labor-saving, which is beneficial to accurately determining the height of the calibration target. In a gear reduction assembly, the first helical gear 263 is located within the shell 261 and is fixedly mounted to the handle 262. The rotation axis of the first helical gear 263 coincides with the rotation axis of the handle 262, and the first helical gear 263 and the handle 262 can rotate together around the first rotation axis O1.

The second helical gear 264 is mounted on the inner wall of the shell 261 and can rotate about a second rotation axis O2. The first helical gear 263 meshes with the second helical gear 264, and the diameter of the first helical gear 263 is smaller than that of the second helical gear 264.

The first transmission gear 265 is fixedly mounted to the second helical gear 264, the rotation axis of the first transmission gear 265 coincides with the rotation axis of the second helical gear 264, and the first transmission gear 265 and the second helical gear 264 can rotate together about the second rotation axis O2.

The second transmission gear 266 is mounted to the inner wall of the shell 261 and can rotate about a third rotation axis O3. The second transmission gear 266 meshes with the first transmission gear 265 and the rack 260, respectively. The second transmission gear 266 is provided with a boss 2662 for cooperating with a ratchet wheel (not shown) to stop the second transmission gear 266 in a preset position. The first transmission gear 265 and the second transmission gear 266 are both straight gears, and the diameter of the first transmission gear 265 is smaller than that of the second transmission gear 266.

The first rotation axis O1 is perpendicular to the second rotation axis O2 and the third rotation axis O3, and the first rotation axis O1 is perpendicular to the rack 260. The second rotation axis O2 and the third rotation axis O3 are arranged in parallel, and the second rotation axis O2 and the third rotation axis O3 are perpendicular to the rack 260.

When the handle 262 rotates about the first rotation axis O1, the first helical gear 263 is driven to rotate about the first rotation axis O1, the second helical gear 264 and the first transmission gear 265 rotate about the second rotation axis O2, and the second transmission gear 266 rotates about the third rotation axis O3. When the second transmission gear 266 rotates around the third rotation axis O3, the rack 260 is driven to ascend or descend along the length direction of the movable vertical rod 24 so that the movable vertical rod 24 ascends or descends relative to the fixed vertical rod 22.

In the present embodiment, the first helical gear 263 and the second helical gear 264 mesh, the first transmission gear 265 and the second helical gear 264 can rotate together about the second rotation axis O2, and the second transmission gear 266 is meshed with the first transmission gear 265 and the rack 260, respectively, to drive the movable vertical rod 24 to move stably relative to the fixed vertical rod 22. In addition, the diameter of the first helical gear 263 is smaller than that of the second helical gear 264, and the diameter of the first transmission gear 265 is smaller than that of the second transmission gear 266 so that the movable vertical rod 24 can be driven to move relative to the fixed vertical rod 22 by a small force.

It will be understood that in some other embodiments, the first helical gear 263 and the second helical gear 264 may be omitted. The first transmission gear 265 is fixedly mounted to the handle 262, and the handle 262 can rotate about the second rotation axis O2, thereby driving the first transmission gear 265 to rotate about the second rotation axis O2.

It will be understood that in some other embodiments, the first helical gear 263, the second helical gear 264, and the first transmission gear 265 may be omitted. The second transmission gear 266 is fixedly mounted to the handle 262, and the handle 262 can rotate about the third rotation axis O3, thereby driving the second transmission gear 266 to rotate about the third rotation axis O3.

Figure 6:
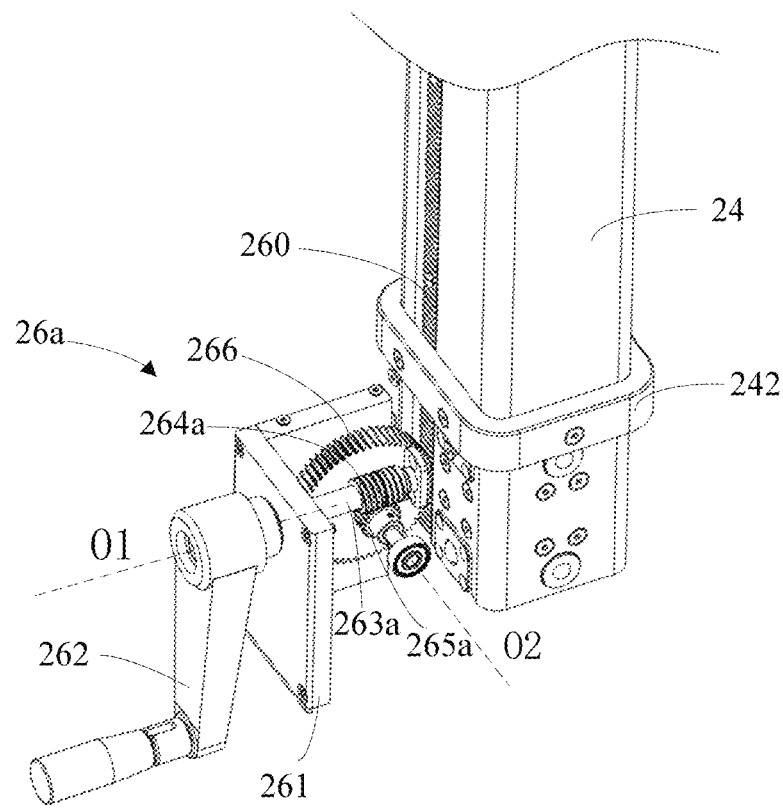
FIG. 6 is a stereogram of a vertical frame assembly, with some elements omitted, according to some embodiments.

Referring to FIG. 6, in some embodiments, the first helical gear 263, the second helical gear 264, and the first transmission gear 265 may be replaced with a worm mechanism that includes a worm 263a and a worm wheel 265a.

One end of the worm 263a is fixedly mounted to the handle 262, the rotation axis of the worm 263a coincides with the rotation axis of the handle 262, and the worm 263a and the handle 262 can rotate together about the first rotation axis O1.

The worm 263a has a cylindrical shape, and the outer surface thereof has a toothed portion 264a. The toothed portion 264a meshes with the worm wheel 265a.

The worm wheel 265a is fixedly mounted to the second transmission gear 266, the rotation axis of the worm wheel 265a coincides with the rotation axis of the second transmission gear 266, and the worm wheel 265a and the second transmission gear 266 can rotate together around the second rotation axis O2. The diameter of the worm wheel 265a is smaller than that of the second transmission gear 266 so that the movable vertical rod 24 can be driven to move relative to the fixed vertical rod 22 by a small force. The first rotation axis O1 is perpendicular to the second rotation axis O2, and the second rotation axis O2 is perpendicular to the rack 260.

When the movable vertical rod 24 moves to the desired position relative to the fixed vertical rod 22, the movable vertical rod 24 can be fixed to the desired position by the self-locking function of the worm mechanism.

It will be understood that in some other embodiments, the handle 262 may be replaced with a motor.

It will be understood that in some other embodiments, in addition to a gearbox, the driving mechanism 26 may be other driving mechanisms, such as a lead screw drive, a synchronous belt, etc. so long as the movable vertical rod 24 can be driven to move relative to the fixed vertical rod 22.

In some embodiments, the movable vertical rod 24 is provided with a limiting member 242, the limiting member 242 is located in the fixed vertical rod 22, the inner wall of the fixed vertical rod 22 is provided with a flange, and the flange is close to the top end of the fixed vertical rod 22. When the movable vertical rod 24 moves relative to the fixed vertical rod 22 until the limiting member 242 abuts against the flange, the movable vertical rod 24 stops moving so that the movable vertical rod 24 can be prevented from separating from the fixed vertical rod 22. In this embodiment, the limiting member 242 is a collar that fits over the outer wall of the movable vertical rod 24.

Figure 7:
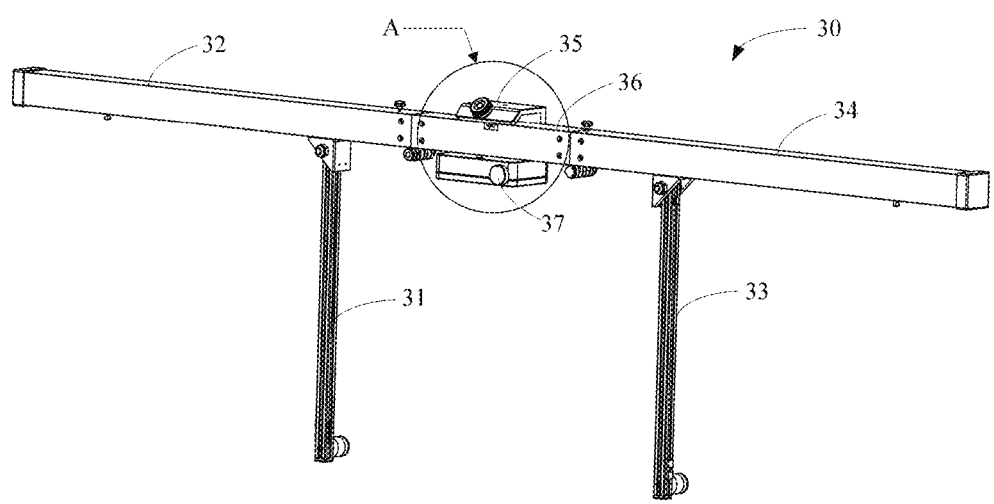
FIG. 7 is a stereogram of a cross beam assembly of the calibration bracket shown in FIG. 1.
Figure 8:
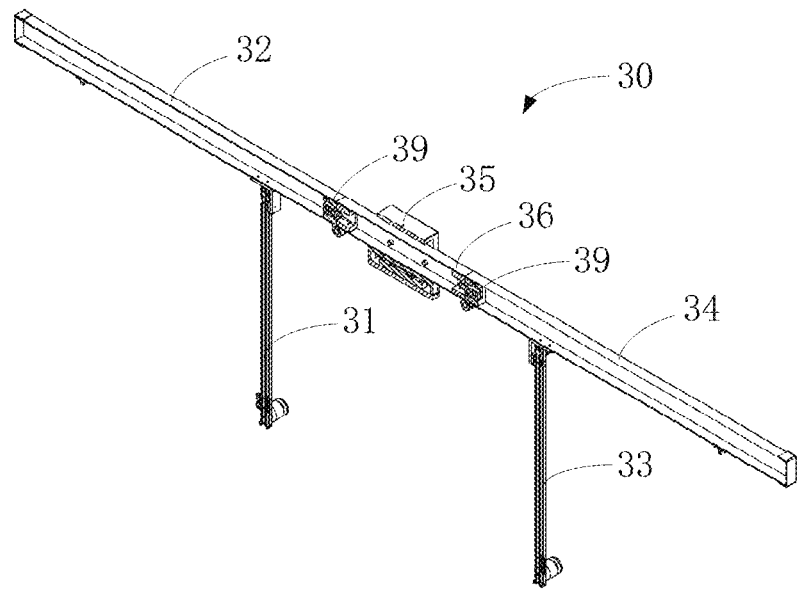
FIG. 8 is a sectional view of the cross beam assembly shown in FIG. 7.
Figure 9:
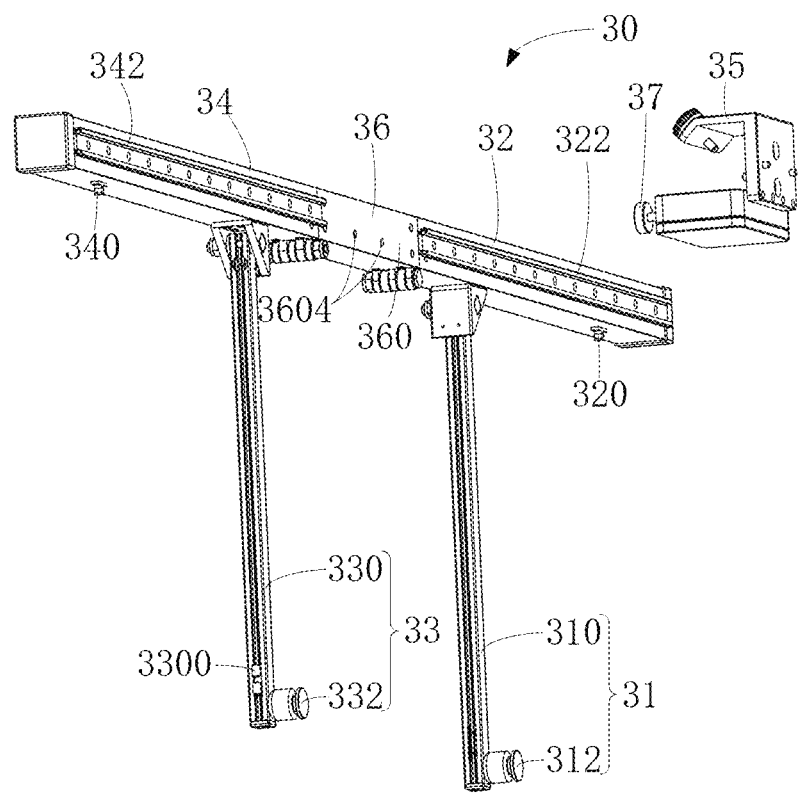
FIG. 9 is an exploded view of the cross beam assembly shown in FIG. 7.

Referring to FIGS. 7, 8, and 9, the cross beam assembly 30 includes a first support rod 31, a first cross beam portion 32, a second support rod 33, a second cross beam portion 34, a mounting seat 35, a connecting portion 36, an adjustment mechanism 37, and an articulation mechanism 39. The first support rod 31 and the second support rod 33 function to support the target against falling, especially when the target has a large area and a heavy weight.

One end of the first support rod 31 may be pivotally connected to the first cross beam portion 32 by a hinge mechanism, a bisagra mechanism, etc. The first support rod 31 may rotate relative to the first cross beam portion 32 so as to be unfolded to be perpendicular to the first cross beam portion 32, and may be engaged with and parallel to the first cross beam portion 32.

The first support rod 31 includes a first support rod body 310 and a first support member 312. One end of the first support rod body 310 is hinged to the first cross beam portion 32, and the other end of the first support rod body 310 is mounted to the first support member 312. The side wall of the first support rod body 310 is provided with a first locking groove (not shown).

Similarly, one end of the second support rod 33 may be hinged to the second cross beam portion 34 by a hinge mechanism, a bisagra mechanism, etc. The second support rod 33 may rotate relative to the second cross beam portion 34 to be unfolded to be perpendicular to the second cross beam portion 34, or may be engaged with and parallel to the second cross beam portion 34. The second support rod 33 includes a second support rod body 330 and a second support member 332. One end of the second support rod body 330 is hinged to the second cross beam portion 34, and the other end of the second support rod body 330 is mounted to the second support member 332. The side wall of the second support rod body 330 is provided with a second locking groove 3300. The first support member 312 and the second support member 332 extend in the same direction. When the first support rod 31 is unfolded to be perpendicular to the first cross beam portion 32 and the second support rod 33 is unfolded to be perpendicular to the second cross beam portion 34, the first locking groove and the second locking groove 3300 are arranged away from each other, and the first support member 312 and the second bracket member 332 can be used to jointly support a calibration element, such as a pattern plate.

The first cross beam portion 32 is provided with a first locking block 320 and a first guide rail 322. The first locking block 320 and the first support rod 31 are both connected to the same side of the first cross beam portion 32. When the first support rod 31 rotates to be parallel to the first cross beam portion 32, the first locking block 320 is locked into a first locking groove, and the first support rod 31 is locked to the first cross beam portion 32. The first guide rail 322 is arranged on the other side of the first cross beam portion 32, the first guide rail 322 is arranged in parallel with the first cross beam portion 32, the first guide rail 322 is used for mounting a pendant for mounting a calibration element, such as a calibration target, a reflector, a laser, etc. and the pendant can slide along the first guide rail 322.

Similarly, the second cross beam portion 34 is provided with a second locking block 340 and a second guide rail 342. The second locking block 340 and the second support rod 33 are both connected to the same side of the second cross beam portion 34. When the second support rod 33 rotates to be parallel to the second cross beam portion 34, the second locking block 340 is locked into the second locking groove 3300 so that the second support rod 33 is locked to the second cross beam portion 34. The second guide rail 342 is arranged on the other side of the second cross beam portion 34, the second guide rail 342 is arranged in parallel with the second cross beam portion 34, the second guide rail 342 is used for mounting a pendant for mounting a calibration element, such as a reflector, and the pendant can slide along the second guide rail 342. The first guide rail 322 and the second guide rail 342 are symmetrically arranged relative to the connecting portion 36, and the first cross beam portion 32 and the second cross beam portion 34 are also symmetrically arranged relative to the connecting portion 36. When the base 10 is placed in a horizontal plane, the first guide rail 322, the second guide rail 342, the first cross beam portion 32, and the second cross beam portion 34 are all horizontally arranged.

It will be understood that in some other embodiments, the positions of the first locking block 320 and the first locking groove may be interchanged, namely, the first locking block 320 is mounted to the first support rod body 310, and the first locking groove is provided on the first cross beam portion 32; similarly, the positions of the second locking block 340 and the second locking groove 3300 may also be interchanged, that is, the second locking block 340 is mounted to the second support rod body 330, and the second locking groove 3300 is provided on the second cross beam portion 34. Alternatively, the first locking groove and the second locking groove 3300 are recessed in the corresponding cross beam portions.

It will be understood that in some other embodiments, the first guide rail 322 and the second guide rail 342 may be provided on other faces of the cross beam, such as a top surface. In some other embodiments, the first guide rail 322 and the second guide rail 342 need not be provided, and the calibration element may be hung directly on the cross beam by using a hook, etc. The first guide rail 322 and the second guide rail 342 may also have other configurations, not necessarily as shown. For example, they may be one or several groove lines provided on the top surface of the cross beam, and the outer wall of the cross beam itself may be used to form the groove line without mounting an additional guide rail.

It will be understood that the number of support rods is not limited by the embodiments described above. For example, the support rod may have only one and be provided at an approximately central position of the connecting portion 36 so that at the time, it may also well support a target approximately in the middle of the cross beam assembly 30. When the target for calibration is located at another position, the support rod may also be provided at a corresponding position to perform the supporting. The position of the support rod may also be more than two. In addition, the support rod may also be provided on a track which is provided on the side face or bottom face of the cross beam assembly 30 so that the support rod may be moved along the assembled cross beam assembly 30 to support targets that may be in different positions at an appropriate position.

It will be understood that when a guide rail is used to make the support rod move, the support rod can also be locked on the cross beam assembly 30 by means of a locking block or a locking groove.

The connecting portion 36 of the cross beam is sleeved in the mounting seat 35, the first surface 360 of the connecting portion 36 is concavely provided with a locating hole 3604, the number of locating holes 3604 is preferably two, and two of the locating holes 3604 are provided along the length direction of the connecting portion 36.

Figure 10:
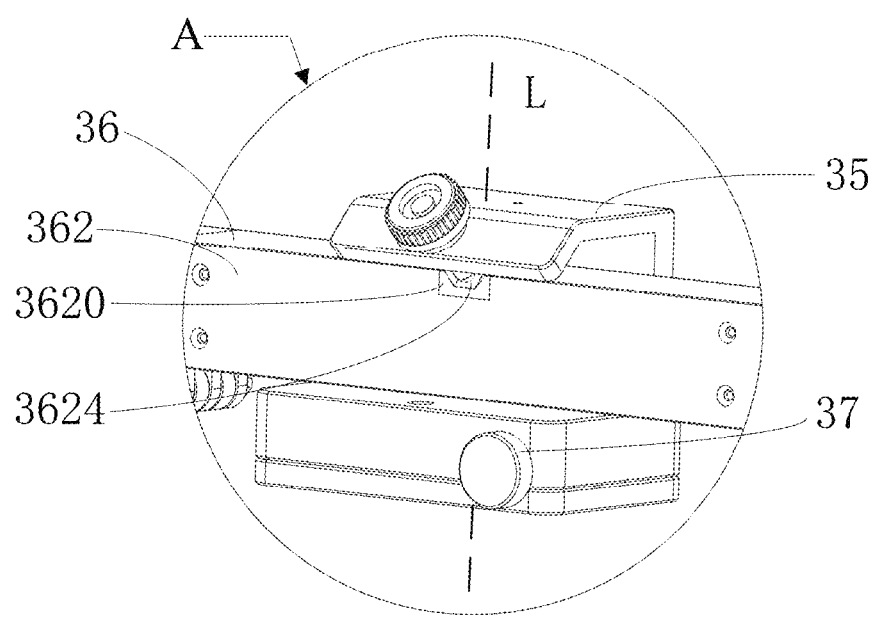
FIG. 10 is a partially enlarged view of portion A of FIG. 7.
Figure 11:
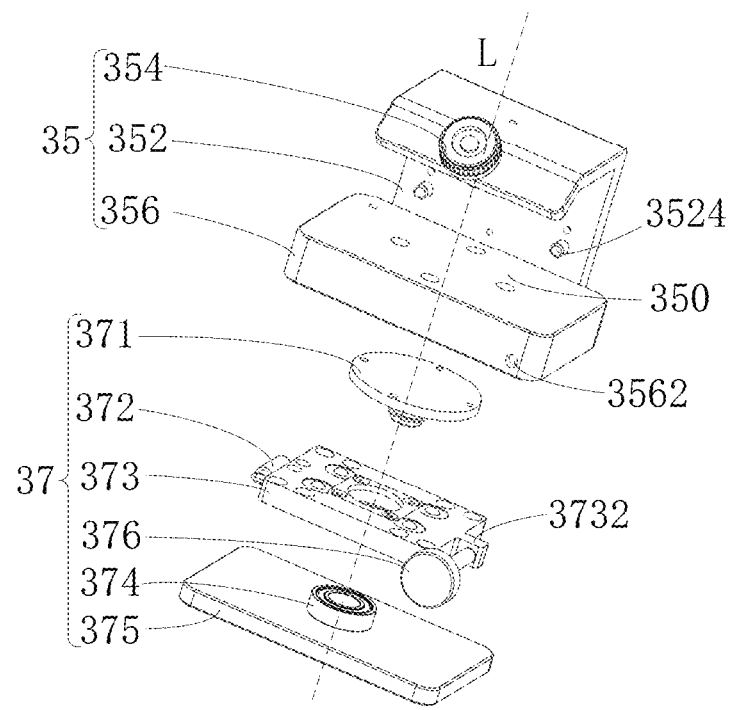
FIG. 11 is an exploded view of an adjustment mechanism of the cross beam assembly shown in FIG. 7.

Referring to FIG. 10, the connecting portion 36 is provided with a fixed groove 3620 in which a fixed surface 3624 is provided, and the fixed groove 3620 cooperates with a fixed rod 354 in FIG. 11 to fix the cross beam assembly to the mounting seat 35. Alternatively, the fixed groove 3620 is provided such that the fixed surface 3624 is at an angle to the bottom surface of the mounting seat 35. The advantages of this arrangement are illustrated in conjunction with the fixed rod in FIG. 11. For example, the fixed groove 3620 may be provided between the second surface 362 of the cross beam and the top surface, wherein the second surface 362 is provided parallel to the first surface 360, and the fixed surface 3624 is provided at an angle to the first surface 360 and the second surface 362, such as 45 degrees to the first surface 360 and the second surface 362.

In this embodiment, the first cross beam portion 32, the second cross beam portion 34, and the connecting portion 36 are all square tubes so that the weight of the calibration bracket 100 can be reduced, and the connecting portion 36 can be easily and securely sleeved in the adjustment mechanism 38. It will be understood that in some other embodiments, the first cross beam portion 32, the second cross beam portion 34, and the connecting portion 36 may be tubing, special-shaped materials, rods, etc. of other shapes, for example, tubing or rods that are polygonal or circular. When the cross beam is tubing of other shapes, the fixed groove 3620 may be positioned such that the fixed surface 3624 is at an angle to the bottom surface of the mounting seat 35.

Figure 12:
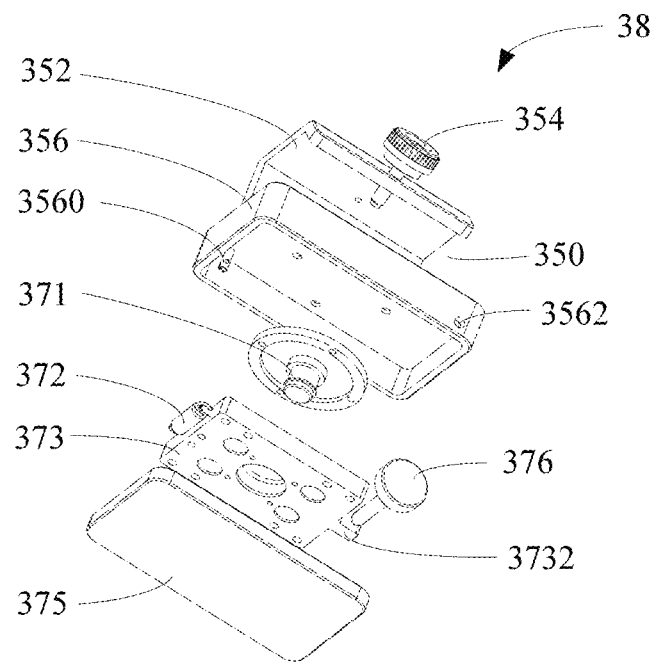
FIG. 12 is an exploded view of another angle of the adjustment mechanism shown in FIG. 11.

Referring to FIGS. 11 and 12, the mounting seat 35 is configured to sleeve the connecting portion 36. The mounting seat 35 includes a holding member 352, a fixed rod 354, and a mounting shell 356.

Alternatively, the mounting seat 35 may be provided on the adjustment mechanism 37 such that the mounting seat 35 may rotate relative to the vertical frame assembly 20 about an adjustment rotation axis L under the adjustment of the adjustment mechanism 37 so as to adjust the horizontal angles of the mounting seat 35 and the cross beam assembly 30. Preferably, the adjustment mechanism 37 is provided in an up and down relationship with the mounting seat to facilitate easy removal and mounting of the cross beam from above while achieving horizontal angular adjustment. The adjustment rotation axis L is arranged in parallel with the fixed vertical rod 22 and the movable vertical rod 24, that is, when the calibration bracket 100 is placed on a horizontal plane, the adjustment rotation axis L is arranged vertically. The mounting seat 35 is provided with a notch 350 for facilitating placing the connecting portion 36 into the mounting seat 35 or removing the connecting portion 36 from the mounting seat 35.

The holding member 352 is generally hook-shaped to facilitate fixing the connecting portion 36. One end of the holding member 352 is fixedly connected to a mounting shell 356, such as being mounted on an upper surface or side face of the mounting shell 356, and the other end surrounds and holds the connecting portion 36 of the cross beam assembly 20, leaving a notch 350. For example, the holding member 352 may have the shape shown in FIG. 11, but may have other shapes, such as a circular hook shape, a hook shape having other polygonal shapes, or a hook shape having a combination of a circular ring and a polygonal shape, as long as a stable grip on the connecting portion 36 can be achieved. As used herein, "generally hook-shaped" means that the holding member 352 can extend a length from an angle to support and hold the connecting portion 36.

The holding member 352 and the mounting shell 356 enclose to form a mounting channel for receiving the connecting portion 36. The mounting channel communicates with the notch 350. A locating post 3524 is provided on an inner surface of the holding member 352, and two of the locating posts 3524 are located in the mounting channel for inserting two of the locating holes 3604 (see FIG. 8) to facilitate positioning the connecting portion 36 in the mounting channel. The function of the locating hole is to further reduce any displacement of the cross beam assembly 20 in the horizontal direction relative to the mounting seat 35 during calibration. The locating post 3524 may also be provided on the upper surface of the mounting shell 356 or on both the upper surface of the mounting shell 356 and the inner surface of the holding member 352. Here, the "locating post" includes a circular, square, elongated locating post, and the "locating hole" includes a circular, square, elongated locating hole. When the locating post and locating hole are generally point-shaped, at least two locating posts 3524 are preferably provided along the length direction of the connecting portion 36 to ensure that the connecting portion 36 is not displaced along the length direction. When the locating post and locating hole are generally elongated, only one pair of locating post and locating hole may be used. It will be understood that in some other embodiments, the positions of the locating hole 3604 and the locating post 3524 may be interchanged, i.e. the locating hole 3604 is opened in the holding member 352 and communicates with the mounting channel, and the locating post 3524 is provided on the first surface 360 (see FIG. 8).

Alternatively, the fixed rod 354 is provided on the holding member 352. The fixed rod 354 comprises a knob and at least one section of a screw rod, and cooperates with the thread of the holding member 352. When the connecting portion 36 is sleeved on the mounting seat 35, the central axis of the fixed rod 354 is perpendicular to the fixed surface 3624 at the cross beam connecting portion 36; the fixed rod 354 is rotated so that the fixed rod 354 abuts tightly against the fixed surface 3624 so that the connecting portion 36 of the cross beam assembly is fixed to the mounting seat 35, or the fixed rod 354 is rotated such that the fixed lever 354 may be separated from the fixed surface 3624 and the connecting portion 36 may be removed from the mounting seat 35 through the notch 350.

Alternatively, the fixed surface 3624 is at an angle to the bottom surface (i.e. horizontal plane) of the mounting seat 35, and the fixed rod 354 is at an angle greater than 0 degrees and less than 90 degrees to the bottom surface of the mounting seat 35. Alternatively, the angle is generally 45 degrees. With this arrangement, it is possible to apply a compressing force to the connecting portion 36 towards the bottom surface and a side face of the mounting seat, the side face being the side face opposite to the extension direction of the fixed rod 354 itself, so as to realize the highly stable fixation of the connecting portion 36 by the fixed seat so that the cross beam assembly can be easily disassembled and assembled.

It will be understood that the mounting seat 35 may have other configurations, such as not necessarily having one notch, and the notch may be blocked by using a baffle and the like after the connecting portion 36 is placed into the mounting seat 35. It is also possible to mount the connecting portion 36 in other ways. For example, the case that the mounting 35 can be one complete ring-shaped structure without a notch for placing the cross beam. At the time, the cross beam can be assembled first and then inserted into the mounting seat 35, and the cross beam is screwed and fixed with the fixed rod 354.

It will be understood that the bottom face or side face of the mounting seat 35 against which the connecting portion 36 is pressed may be a circular arc or other irregular shapes. At this time, the fixed rod 354 can also be used to compress the connecting portion 36 on these faces. At this time, the fixed rod and these faces may be in line contact rather than surface contact, but the compressing effect will not be affected.

Alternatively, when the mounting seat 35 includes a notch 350, the surface of the mounting seat 35 facing away from the notch 350 may also be used for mounting a calibration element, such as a multi-line laser 200 (see FIG. 1), etc.

The mounting shell 356 is generally cuboid with an opening on one side. The adjustment mechanism 37 is provided within an opening of the mounting shell 356. The mounting shell 356 is provided with a threaded hole 3562. The adjustment mechanism 37 includes a supporting shaft 371, a first elastic member 372, a rotational member 373, a bearing seat 374, a pedestal 375, and an adjustment lever 376. The adjustment mechanism 37 is used to adjust the angle of the cross beam assembly 20 in the horizontal direction (i.e. the yaw angle).

The supporting shaft 371 is accommodated in the mounting shell 356, and is fixedly mounted to an inner wall of the mounting shell 356. The central axis of the supporting shaft 371 coincides with the adjustment rotation axis L.

One end of the first elastic member 372 is fixed to the mounting post 3560, and the other end of the first elastic member 372 is fixed to the rotational member 373. In this embodiment, the first elastic member 372 is a contact spring.

The rotational member 373 is generally cubic, one end thereof being provided with a projection 3732. The projection 3732 and the first elastic member 372 are located on two opposite sides of the rotational member 373, respectively. The rotational member 373 is sleeved on the bearing seat 374.

The bearing seat 374 is fixedly mounted to a surface of the pedestal 375 with the central axis of the bearing seat 374 coincident with the adjustment rotation axis L. The rotational member 373 is fixedly mounted to the pedestal 375 and sleeved on the bearing seat 374. One end of the supporting shaft 371 is inserted into the bearing seat 374 so that the supporting shaft 371 and the mounting shell 356 can rotate together about the adjustment rotation axis L relative to the rotational member 373, the bearing seat 374, and the pedestal 375.

The pedestal 375 is used to be mounted to the movable vertical rod 24, and the movable vertical rod 24 can drive the pedestal 375 up or down. In this embodiment, the pedestal 375 is cubic that covers the opening of the mounting shell 356. The supporting shaft 371, the first elastic member 372, and the rotational member 373 are all housed in a cavity enclosed by the mounting shell 356 and the pedestal 375.

The term "cubic" as used herein includes the case of a sheet.

The adjustment lever 376 is mounted in the threaded hole 3562, and the adjustment lever 376 is rotated such that the adjustment lever 376 abuts tightly against the projection 3732. The mounting seat 35 is pushed to rotate about the adjustment rotation axis L relative to the rotational member 373 and the pedestal 375, thereby adjusting the horizontal angles of the mounting seat 35 and the connecting portion 36 such that the first elastic member 372 is stretched. Rotating the adjustment lever 376 in the opposite rotational direction, the mounting seat 35 is rotationally reset relative to the rotational member 373 and pedestal 375 by being pulled by the first elastic member 372 about the adjustment rotation axis L.

It will be understood that in some other embodiments, the pedestal 375 may be omitted and the rotational member 373 and bearing seat 374 may be directly fixedly mounted to the top surface of the movable vertical rod 24.

It will be understood that the adjustment mechanism 37 described above may be alternatively used. When the adjustment mechanism 37 is removed, the mounting shell 356 of the mounting seat 35 may be removed and the holding member 352 is mounted at the top surface of the movable vertical rod 24 or other extra additional mounting face. It should be understood that the holding member 352 may also extend to form a bottom surface and surround the lower surface of the connecting portion 36 of the cross beam assembly 30, i.e. the holding member 352 may have a bottom surface that is mounted on the mounting shell 356.

Figure 13:
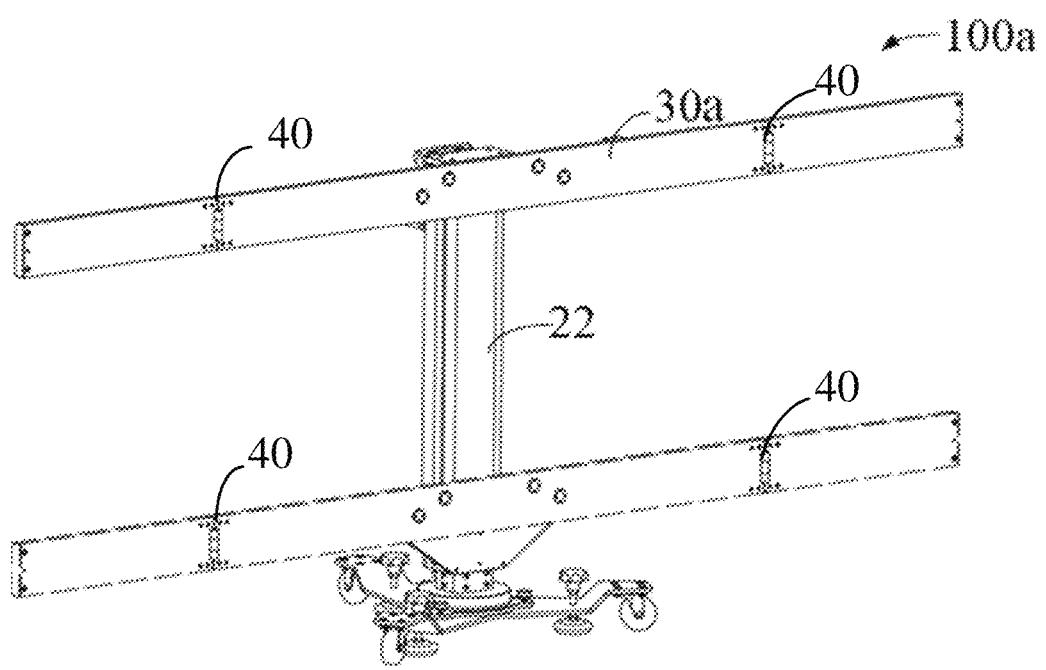
FIG. 13 is a stereogram of a calibration bracket according to another embodiment of the present application, wherein a movable vertical rod of the calibration bracket is moved to a lower limit position and a dotted line represents another mounting position of the cross beam of the calibration bracket.
Figure 14:
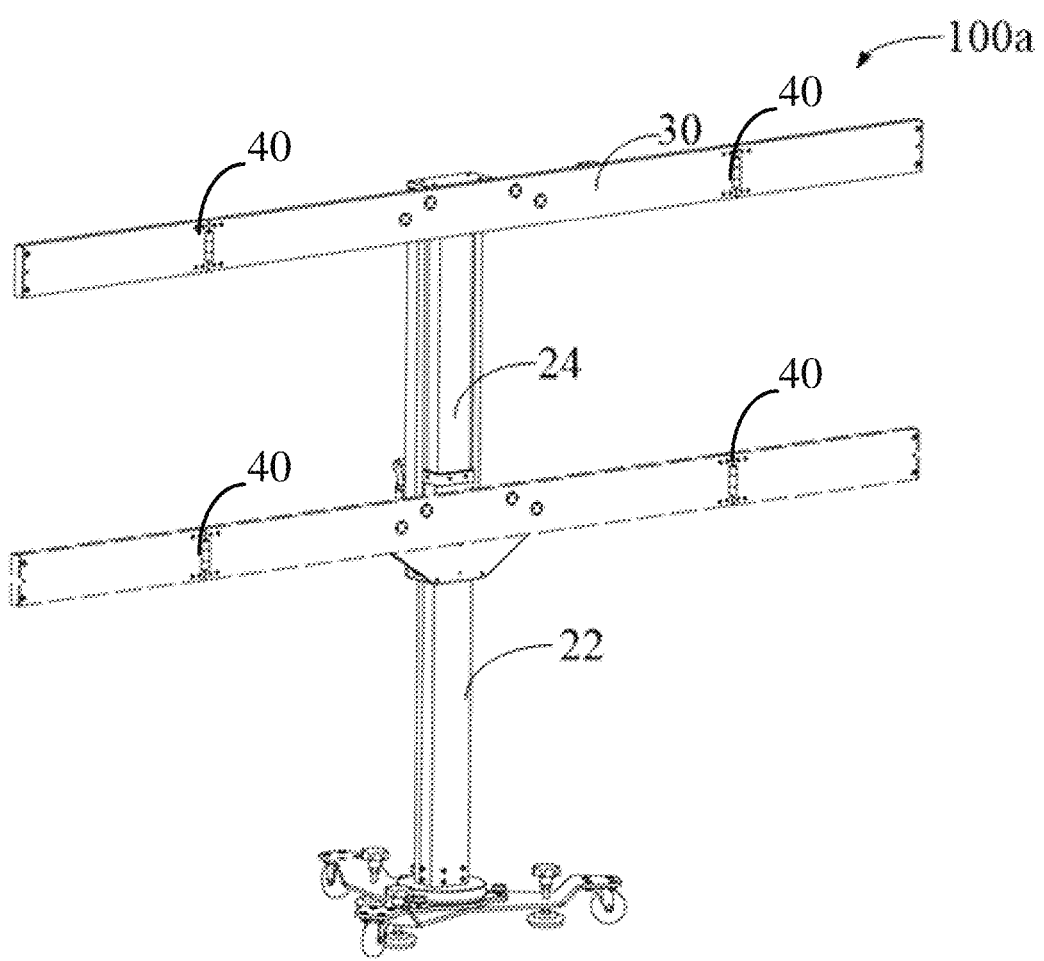
FIG. 14 is a stereogram of another state of the calibration bracket shown in FIG. 13, wherein a movable vertical rod of the calibration bracket moves to an upper limit position.

With reference to FIGS. 13 and 14, another embodiment of the present application provides a calibration bracket 100a that is substantially identical to the calibration bracket 100 provided by the previous embodiments, the main difference being that the cross beam 30a of the calibration bracket 100a is detachably mounted to at least one of the first position and second position of the movable vertical rods 24, thereby enabling a calibration element mounted on the cross beam 30a to be located at different heights so as to be adapted to more systems in an advanced assistant driver system of a vehicle. The first position is higher than the second position.

The vertical frame assembly in the present embodiment includes the movable vertical rod 24 and the fixed vertical rod 22, which can be referred to the description of the above embodiments and will not be described in detail.

The calibration bracket 100a also includes a hanging members 40. Each of the hanging member 40 is mounted to the cross beam 30a or the movable vertical rod 24 for mounting the calibration element.

It will be understood that the cross beam 30a may be omitted, i.e. the hanging member 40 may be directly mounted to the movable vertical rod 24, depending on the actual circumstances.

Figure 15:
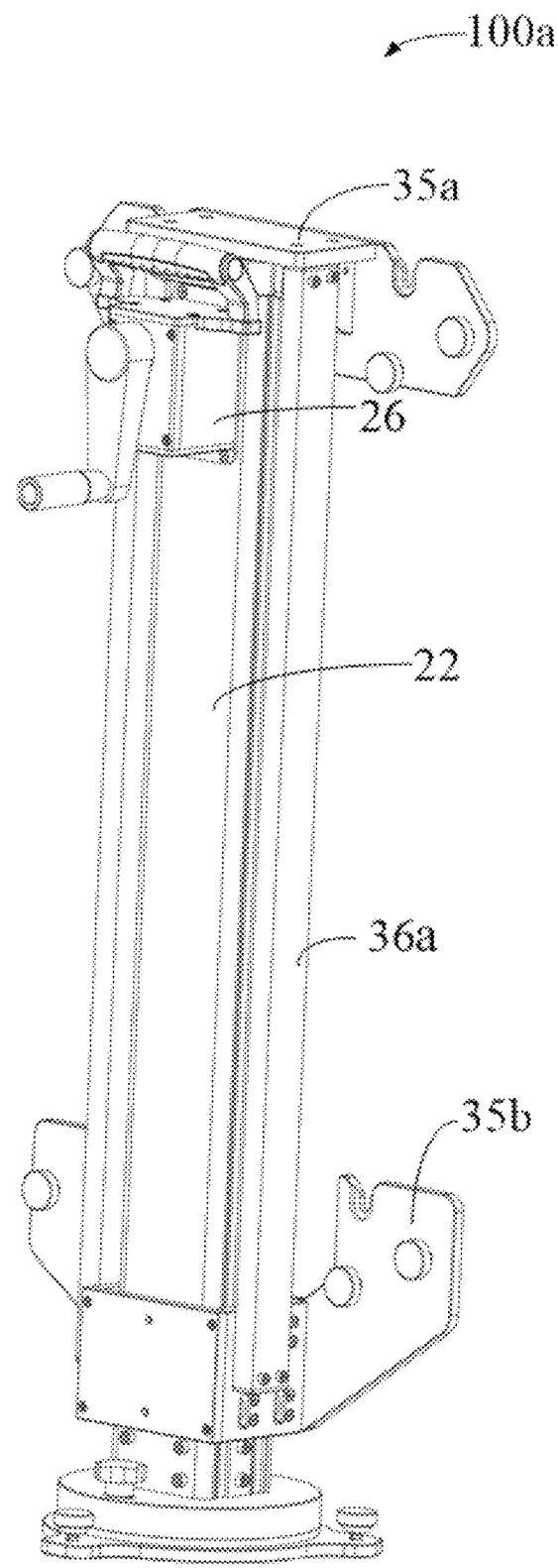
FIG. 15 is a stereogram of a movable vertical rod and a fixed vertical rod of the calibration bracket shown in FIG. 13.
Figure 16:
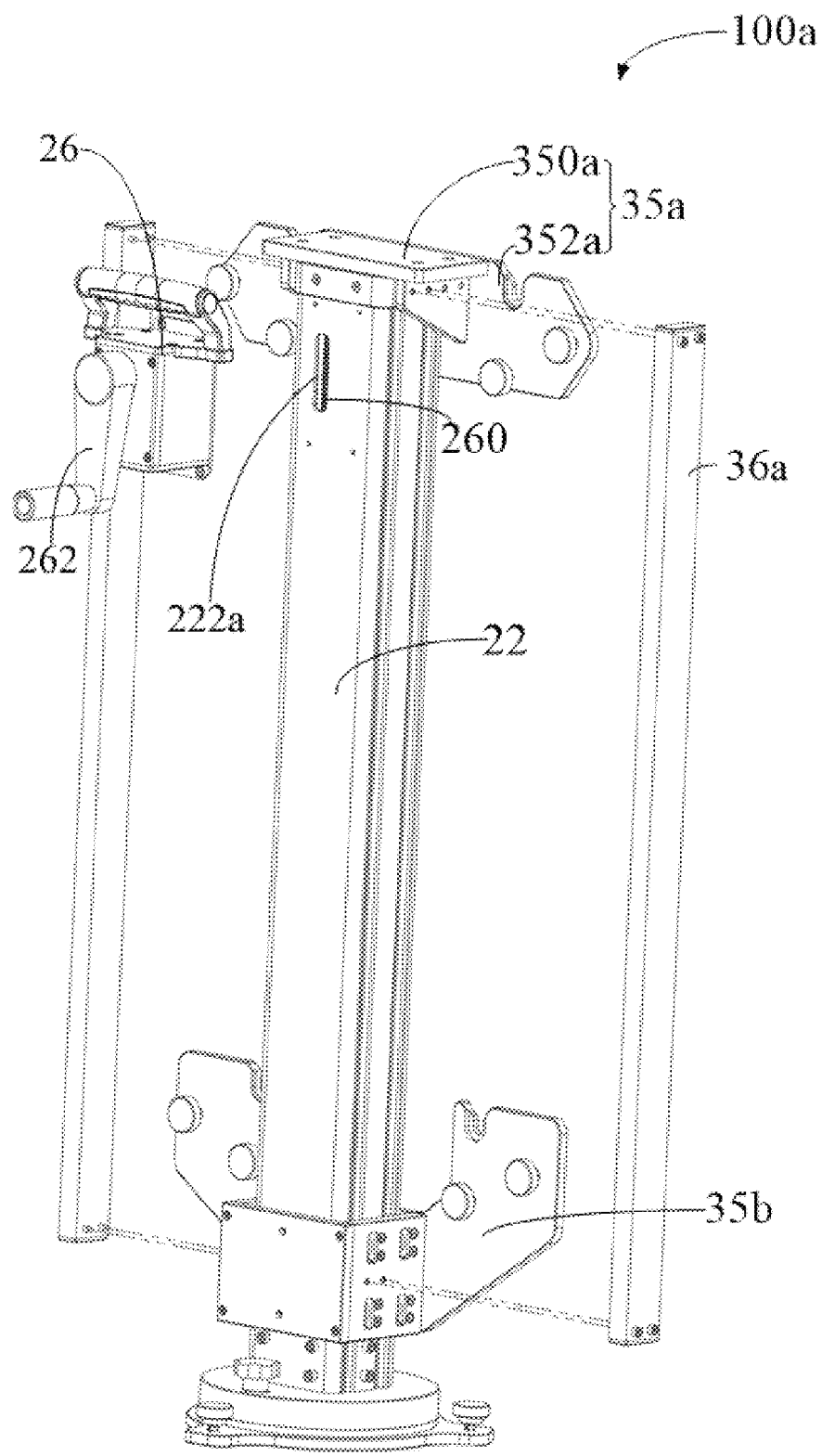
FIG. 16 is an exploded view of the movable vertical rod and the fixed vertical rod shown in FIG. 15.

Referring to FIGS. 15 and 16 together, the calibration bracket 100a includes two mounting blocks, a first mounting seat 35a and a second mounting seat 35b, respectively. The first mounting seat 35a and the second mounting seat 35b are both mounted to the movable vertical rod 24 which is as shown in FIG. 16, wherein the first mounting seat 35a is higher than the second mounting seat 35b. The cross beam 30a is detachably mounted to the first mounting seat 35a or the second mounting seat 35b. When the cross beam 30a is mounted to the first mounting seat 35a, the cross beam 30 is in the first position, and when the cross beam 30a is mounted to the second mounting seat 35b, the cross beam 30 is in the second position.

The movable vertical rod 24 is sleeved in the fixed vertical rod 22. It will be understood that according to practical situations, the movable vertical rod 24 may also be sleeved outside the fixed vertical rod 22, as long as one of the movable vertical rod 24 and the fixed vertical rod 22 is an inner rod and the other is an outer rod, and the inner rod is sleeved in the outer rod.

Figure 17:
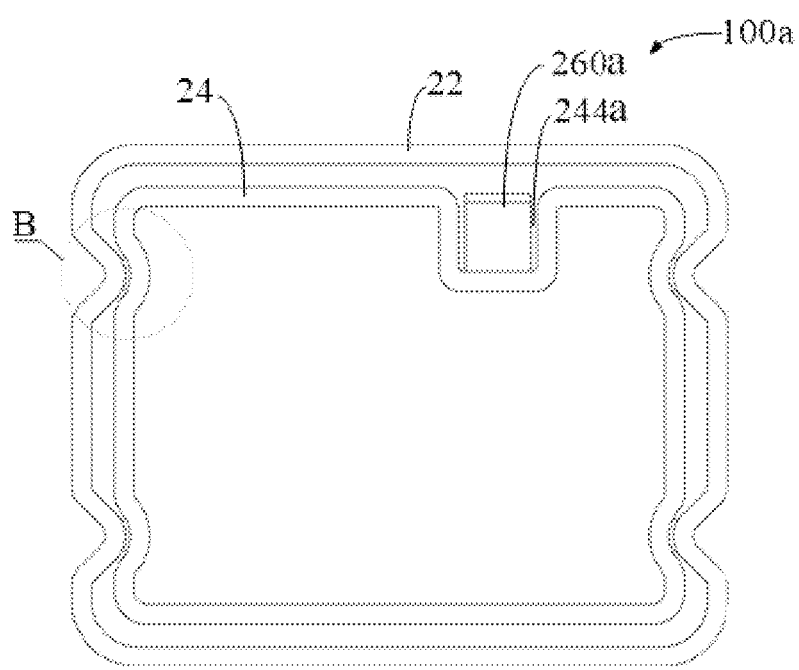
FIG. 17 is a sectional view of the movable vertical rod and the fixed vertical rod shown in FIG. 13.
Figure 18:
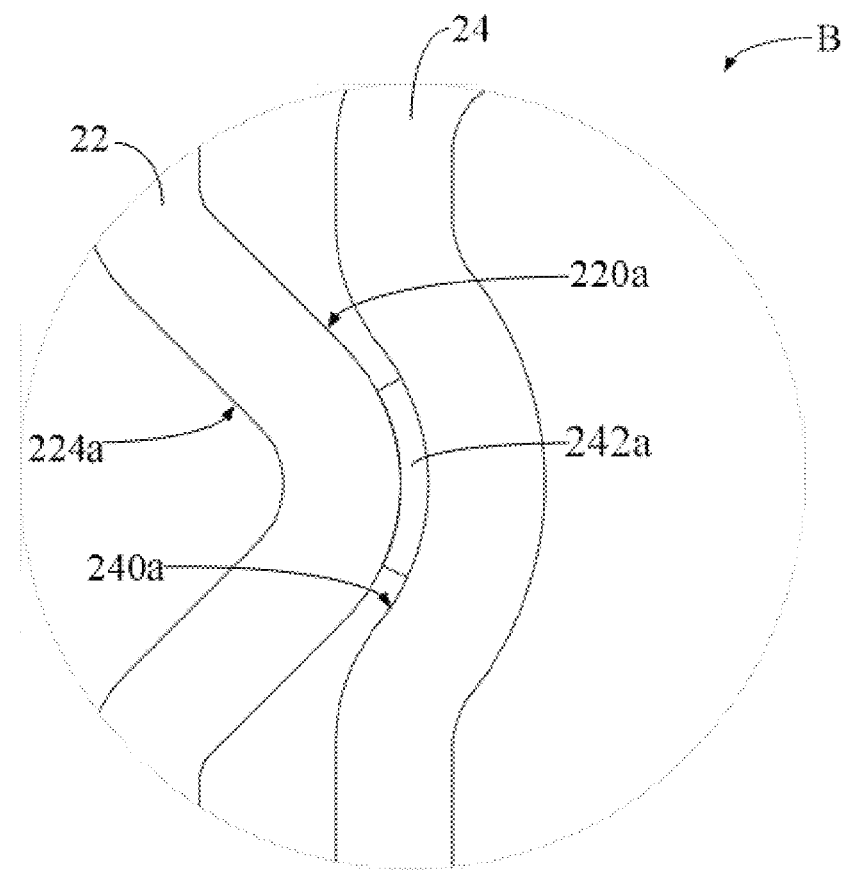
FIG. 18 is a partially enlarged view at B shown in FIG. 17.

Referring to FIGS. 17 and 18 together, a guiding groove 240a is formed on the outside of the movable vertical rod 24, and a guiding projection 220a is formed on the inside of the fixed vertical rod 22. The guiding groove 240a extends along the length direction of the fixed vertical rod 22, and the guiding projection 220a cooperates with the guiding groove 240a to guide the movable vertical rod 24 to move along the length direction of the fixed vertical rod 22. It will be understood that the positions of the guiding groove 240a and the guiding projection 220a may be interchanged according to the actual situation, that is, the guiding groove 240a is formed inside the fixed vertical rod 22 and the guiding projection 220a is formed outside the movable vertical rod 24, as long as one of the guiding groove 240a and the guiding projection 220a is formed outside the movable vertical rod 24 and the other is formed inside the fixed vertical rod 22.

The number of the guiding grooves 240a is plural, and to match that, the number of the guiding projections 220a is plural. Each of the guiding grooves 240a cooperates with one corresponding guiding projection 220a to separate the outside of the movable vertical rod 24 from the inside of the fixed vertical rod 22 so as to reduce the friction force when the movable vertical rod 24 moves so that the movable vertical rod 24 can move more smoothly. It will be understood that the number of the guiding grooves 240a may be only one according to the actual situation. For example, the guiding groove 240a is formed on one side of the movable vertical rod 24 and cooperates with the guiding projection 220a, and the other side of the movable vertical rod 24 directly abuts the outside of the fixed vertical rod 22.

The number of the guiding grooves 240a is four, and the four guiding grooves 240a are evenly distributed on two opposite sides of the movable vertical rod 24. It will be understood that the number of the guiding grooves 240a is not limited to four, but may be three, five, or more than five according to the actual situation, as long as the outside of the movable vertical rod 24 can be separated from the inside of the fixed vertical rod 22.

A brake member 242a is provided in the guiding groove 240a. The brake member 242a has a sheet structure extending in the length direction of the fixed vertical rod 22. The brake member 242a is fixed in the guiding groove 240a and abuts the guiding projection 220a. The brake member 242a serves to provide a friction force driving the movable vertical rod 24 to be fixed relative to the fixed vertical rod 22 along the length direction of the fixed vertical rod 22. By arranging the brake member 242a, the movable vertical rod 24 can be held at a random position under a certain load with good stability during the movement of the movable vertical rod 24 relative to the fixed vertical rod 22 along the length direction of the fixed vertical rod 22. It will be understood that on the one hand, the brake member 242a may also be fixed to the guiding projection 220a and abut against the guiding groove 240a as long as the brake member 242a is fixed to one of the guiding groove 240a and the guiding projection 220a and abuts against the other. On the other hand, both the guiding projection 220a and the guiding groove 240a may be omitted according to the actual situation, and at this time, the brake member 242a is directly fixed to one of the outside of the movable vertical rod 24 and the inside of the fixed vertical rod 22, and abuts against the other.

The brake member 242a may be fixed in the guiding groove 240a by the back gum.

The brake member 242a may be a friction strip. According to practical situations, the brake member 242a may also be a friction plate, a friction ball, etc.

It will be understood that the brake member 242a can be applied to a calibration bracket having only one mounting seat in the foregoing embodiments, and the present application does not limit the number and position of the mounting seat.

Referring back to FIGS. 16 and 17, the calibration bracket 100a includes a driving mechanism 26. The driving mechanism 26 is mounted to the fixed vertical rod 22 and connected to the movable vertical rod 24. The driving mechanism 26 is used for driving the movable vertical rod 24 to move relative to the fixed vertical rod 22 along the length direction of the fixed vertical rod 22. As shown in the previous embodiments, the driving mechanism 26 includes a rack 260, a handle 262, and a gear (not shown). The handle 262 is connected to the gear, which meshes with the rack 260. The rack 260 is mounted to the movable vertical rod 24 and extends along the length direction of the fixed vertical rod 22. By rotating the handle 262, the handle 262 drives the gear to rotate. The gear drives the rack 260 to move along the length direction of the fixed vertical rod 22 so as to move the movable vertical rod 24 relative to the fixed vertical rod 22 along the length direction of the fixed vertical rod 22.

A mounting groove 244a is also formed on the outside of the movable vertical rod 24. The mounting groove 244a extends along the length direction of the fixed vertical rod 22, and the rack 260 is mounted in the mounting groove 244a. The gear is located at one side of the outside of the fixed vertical rod 22, the outside of the fixed vertical rod 22 is provided with a via 222*a* leading to the inside of the fixed vertical rod 22, and the gear meshes with the rack 260 through the via 222*a*.

The first mounting seat 35*a* is mounted on the top end of the movable vertical rod 24 and exposed outside the fixed vertical rod 22. The first mounting seat 35*a* includes a first mounting main body 350*a* and a first hanging plate portion 352*a* connected to each other. The first mounting main body 350*a* is mounted to the top end of the movable vertical rod 24, and the first hanging plate portion 352*a* is used for hitching the cross beam 30*a* to mount the cross beam 30*a* to the first mounting seat 35*a*.

The second mounting seat 35*b* is sleeved outside the fixed vertical rod 22. The second mounting seat 35*b* includes a second hanging plate portion 350*b*. The second hanging plate portion 350*b* is used for hitching the cross beam 30*a* to mount the cross beam 30*a* to the second mounting seat 35*b*.

Figure 19:
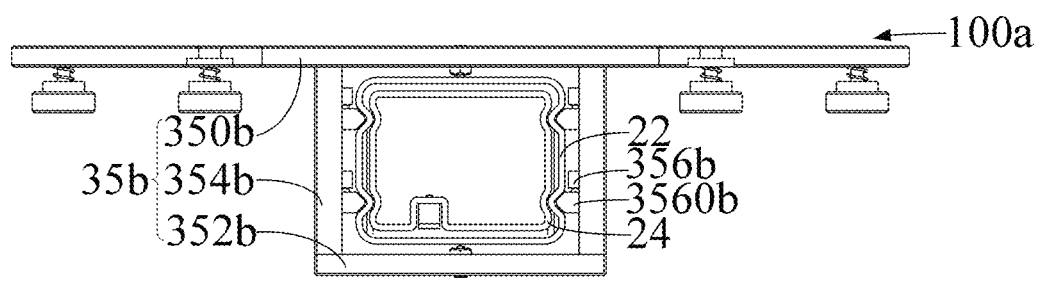
FIG. 19 is a schematic sectional view of the movable vertical rod, fixed vertical rod, and second mounting seat of the calibration bracket shown in FIG. 13.

Referring to FIG. 19 together, an idler pulley assembly 356*b* is mounted inside the second mounting seat 35*b*. The idler pulley assembly 356*b* includes an idler pulley 3560*b*, wherein the idler pulley 3560*b* is rotatable relative to the second mounting seat 35*b*, and the idler pulley 3560*b* abuts against the outside of the fixed vertical rod 22. When the second mounting seat 35*b* moves relative to the fixed vertical rod 22 along the length direction of the fixed vertical rod 22, the idler pulley 3560*b* rotates relative to the second mounting seat 35*b* so that the second mounting seat 35*b* moves more smoothly.

The number of idler pulley assemblies 356*b* is multiple to space the inside of the second mounting seat 35*b* from the outside of the fixed vertical rod 22 so as to reduce the frictional resistance to the second mounting seat 35*b* as the second mounting seat 35*b* moves along the length direction of the fixed vertical rod 22.

The number of the idler pulley assemblies 356*b* is four, and the four idler pulley assemblies 356*b* are evenly distributed on two opposite sides of the inside of the second mounting seat 35*b*. It will be understood that the number of the idler pulley assemblies 356*b* is not limited to four according to actual circumstances. For example, the case that the number of the idler pulley assemblies 356*b* may be three, five, or more than five, as long as the inside of the second mounting seat 35*b* can be spaced from the outside of the fixed vertical rod 22.

Referring back to FIG. 18, a guiding wheel groove 224*a* is formed on the outside of the fixed vertical rod 22. The idler pulley 3560*b* abuts the outside of the fixed vertical rod 22 through the guiding wheel groove 224*a* to reduce the gap between the outside of the fixed vertical rod 22 and the second mounting seat 35*b* so that the two are more compact. The position of the guiding wheel groove 224*a* is opposite to the position of the guiding projection 220*a* so that the thickness of the fixed vertical rod 22 can be reduced and the weight of the fixed vertical rod 22 is light while ensuring the mechanical strength of the fixed vertical rod 22.

The shape of the guiding wheel groove 224 is adapted to the shape of the idler pulley 2560*b* so that the idler pulley 3560*b* is stable and not easily swayed when it moves along the guiding wheel groove 224.

Figure 20:
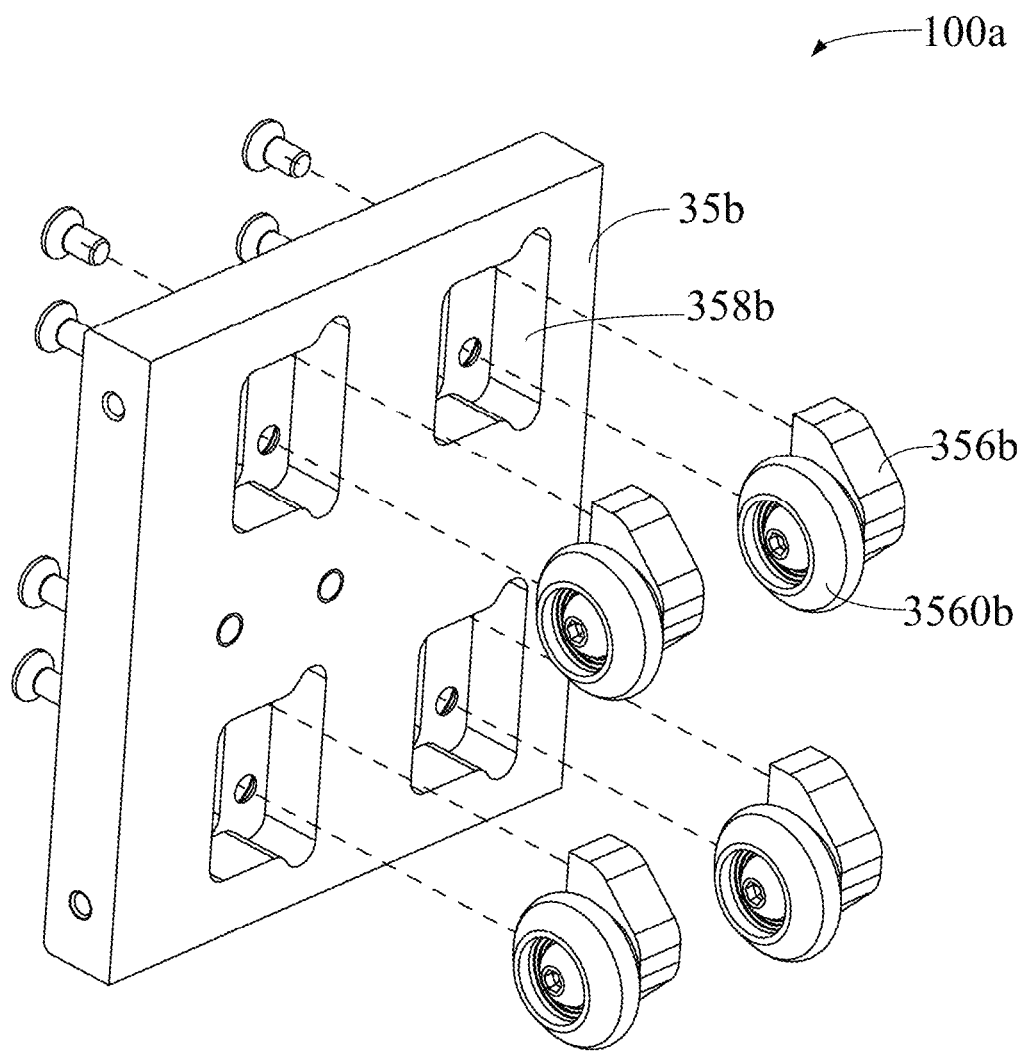
FIG. 20 is a stereogram of a partial structure of the second mounting seat of the calibration bracket shown in FIG. 13.
Figure 21:
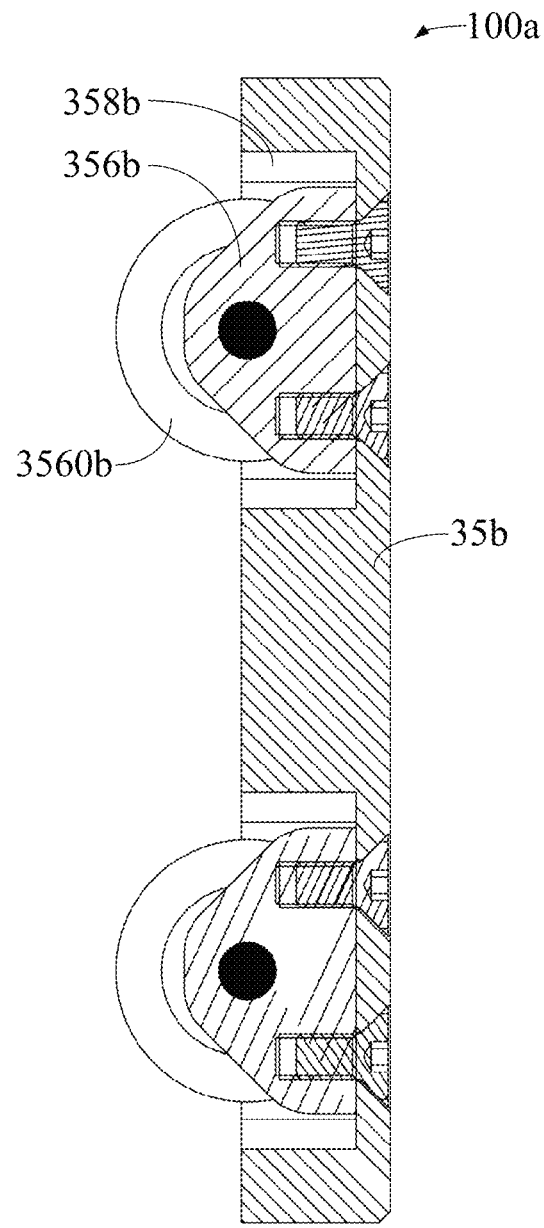
FIG. 21 is a sectional view showing a partial structure of the second mounting seat shown in FIG. 20.

Referring to FIGS. 20 and 21 together, the second mounting seat 35*b* has a mounting wheel groove 358*b* formed therein. The idler pulley assembly 356*b* is mounted within the mounting wheel groove 358*b* such that a portion of the idler pulley 3560*b* is received within the mounting wheel groove 358*b* and another portion is exposed outside the mounting wheel groove 358*b* and abuts the outside of the fixed vertical rod 22.

Figure 22:
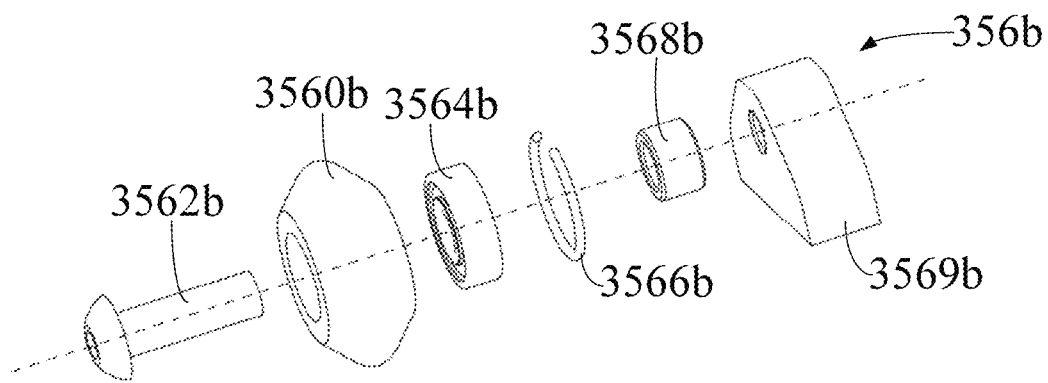
FIG. 22 is an exploded view of an idler pulley assembly of the calibration bracket shown in FIG. 13.
Figure 23:
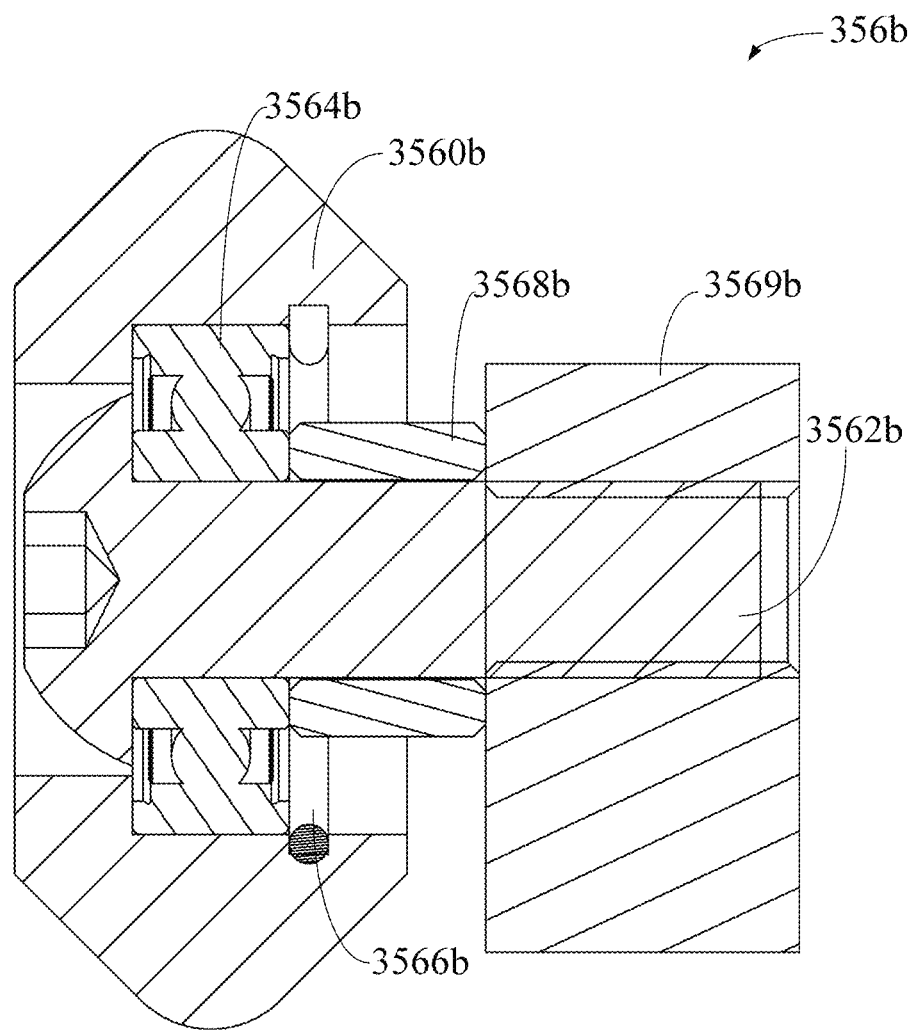
FIG. 23 is a sectional view of the idler pulley assembly shown in FIG. 22.

Referring to FIGS. 22 and 23 together, the idler pulley assembly 356*b* further includes a bolt 3562*b*, a bearing 3564*b*, a retainer ring 3566*b*, a sleeve 3568*b*, and a support seat 3569*b*. The idler pulley 3560*b* is sleeved outside the outer ring of the bearing 3564*b*. The stud of the bolt 3562*b* successively passes through the inner ring of the bearing 3564*b*, the sleeve 3568*b*, and the support seat 3569*b*, and is in threaded fit with the support seat 3569*b*. The head of the bolt 35462*b* abuts one side of the bearing 3564*b*, the retainer ring 3566*b* is sleeved inside the idler pulley 3560*b* and abuts the other side of the bearing 3564*b*, and the sleeve 3568*b* abuts between the bearing 3564*b* and the support seat 3569*b*.

Figure 24:
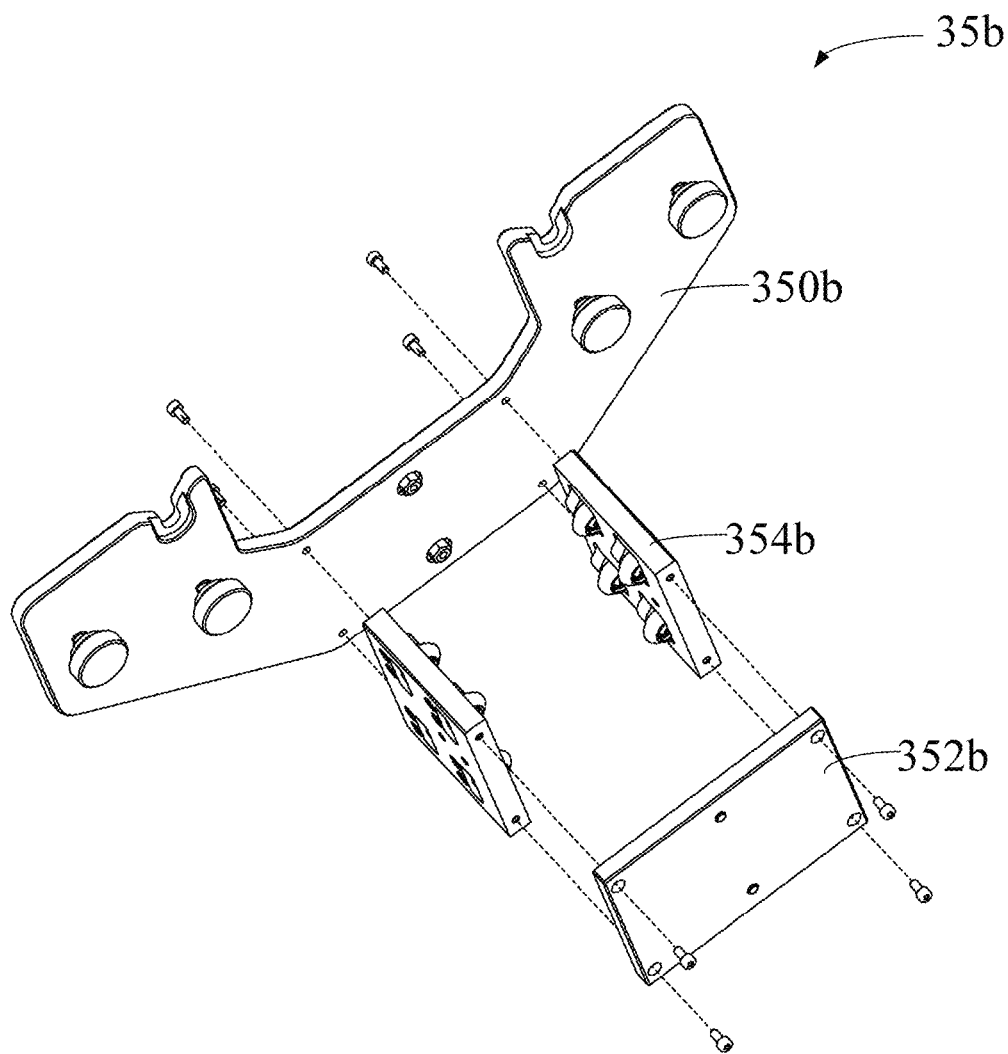
FIG. 24 is an exploded view of the second mounting seat of the calibration bracket shown in FIG. 13.

Referring also to FIG. 24, the second mounting seat 35*b* further includes a first support plate 352*b* and a second support plate 354*b*. The first support plate 352*b* is opposite to the second hanging plate portion 350*b*. The two second support plates 354*b* are opposite to each other and are both connected between the first support plate 352*b* and the second hanging plate portion 350*b*, and the four enclose together to form one sleeve portion for sleeving the fixed vertical rod 22. The first support plate 352*b* and the second support plate 354*b* may be fixed by screws, and the second support plate 354*b* and the hanging plate portion 350*b* may be fixed by screws.

Figure 25:
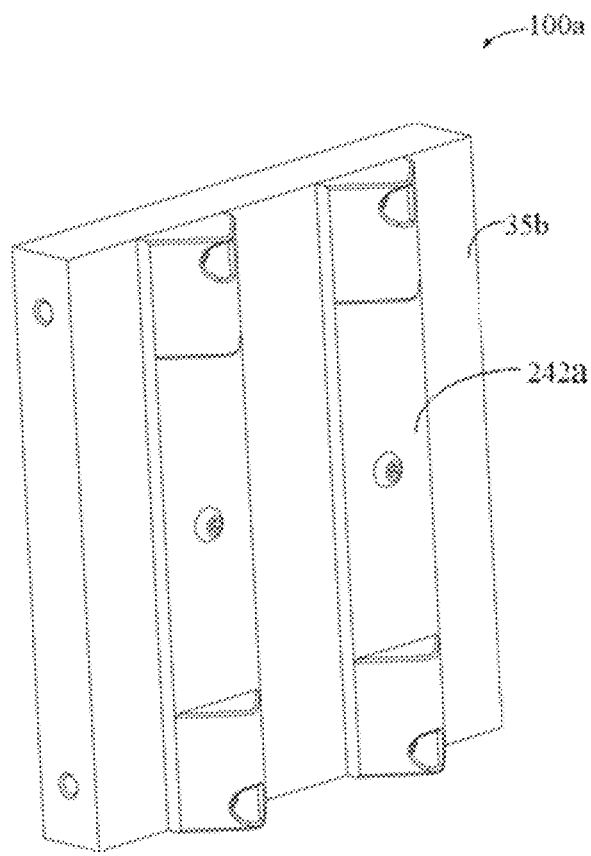
FIG. 25 is a stereogram of another implementation of the second mounting seat of the calibration bracket shown in FIG. 13.
Figure 26:
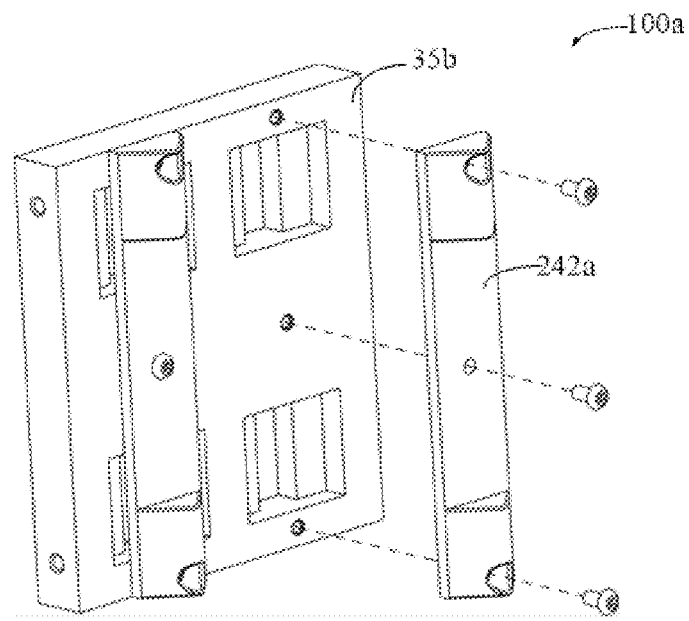
FIG. 26 is a schematic exploded view of the second mounting seat shown in FIG. 25.
Figure 27:
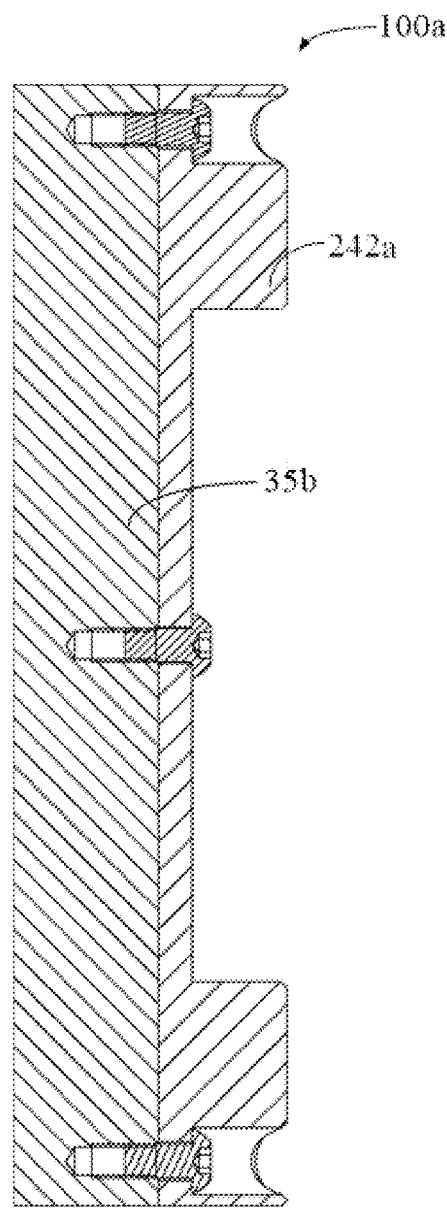
FIG. 27 is a sectional view of the second mounting seat shown in FIG. 26.

Referring to FIGS. 25, 26, and 27 together, in some other embodiments, the idler pulley assembly 356*b* is omitted. The brake member 242*a* has a columnar configuration extending along the length direction of the fixed vertical rod 22, and the brake member 242*a* is provided inside the second mounting seat 35*b* and abuts the outside of the fixed vertical rod 22, and further, the guiding wheel groove 224*a* is omitted, and the guiding groove 240*a* is provided outside the fixed vertical rod 22 and cooperates with the brake member 242*a*. The shape of the brake member 242*a* is adapted to the shape of the guiding groove 240*a* so that when the brake member 242*a* moves along the guiding groove 240*a*, the brake member 242*a* can move more stably without being easily shaken. The brake member 242*a* may be fixed to the second mounting seat 35*b* by a screw. Therefore, the brake member 242*a* may also be provided outside the fixed vertical rod 22 or may also be provided inside the fixed vertical rod 22 as long as it can provide a friction force for driving the movable vertical rod 24 to be fixed relative to the fixed vertical rod 22 in the length direction of the fixed vertical rod 22. It will be understood that, on the one hand, the brake member 242*a* is not limited to be applied to the calibration bracket 100*a* of the present embodiment, but may be applied with the calibration bracket having only one mounting seat of the previously described embodiments, and will not be described in detail herein. On the other hand, the driving mechanism 26 may be omitted, and the movable vertical rod 24 is manually driven to move relative to the fixed vertical rod 22 along the length direction of the fixed vertical rod 22.

Referring to FIGS. 17 and 18 together, the calibration bracket 100*a* further includes a connecting structure that connects the first mounting seat 35*a* and the second mounting seat 35*b* to indirectly mount the second mounting seat 35*b* to the movable vertical rod 24. It will be understood that the coupling structure may be omitted according to the actual situation, and at this time, the second mounting seat 35*b* may be directly mounted to the movable vertical rod 24.

The connecting structure includes a connecting rod 36*a*. The connecting rod 36*a* extends along the length direction of the fixed vertical rod 22, and the top end of the connecting rod 36a is connected to the first mounting seat 35a, and the bottom end of the connecting rod 36 is connected to the second mounting seat 35b.

The number of the connecting rods 36a is two, and the two connecting rods 36a are respectively located on two sides of the fixed vertical rod 22. It will be understood that the number of the connecting rods 36a is not limited to two, and the number of the connecting rods 36a may also be one, three, or more than three according to the actual situation.

A further embodiment of the present application provides a calibration system comprising the calibration bracket 100a of the previous embodiments and a calibration element, the calibration element being mountable to the calibration bracket 100a.

Finally, it should be noted that: the above embodiments are merely illustrative of the technical solutions of the present application, rather than limiting thereto; combinations of technical features in the above embodiments or in different embodiments are also possible within the idea of the present application, and the steps can be implemented in any order, and there are many other variations of the different aspects of the present application as described above, which are not provided in detail for the sake of brevity; although the present application has been described in detail with reference to the foregoing embodiments, those of ordinary skills in the art will appreciate that: the technical solutions disclosed in the above-mentioned embodiments can still be modified, or some of the technical features can be replaced by equivalents; such modifications and substitutions do not depart the essence of corresponding technical solutions from the scope of the technical solutions of various embodiments of the present application.

What is claimed is:

1. A calibration bracket, comprising:
    a base;
    a fixed vertical rod, one end thereof being mounted to the base;
    a movable vertical rod mounted to the fixed vertical rod, wherein the movable vertical rod is configured to move relative to the fixed vertical rod along a length direction of the fixed vertical rod;
    a brake member for providing a friction force for driving the movable vertical rod to be fixed relative to the fixed vertical rod along the length direction of the fixed vertical rod;
    a cross beam mounted to the movable vertical rod, when the movable vertical rod moves along the length direction of the fixed vertical rod relative to the fixed vertical rod, the cross beam is driven to move together; and
    one or more hanging members mounted to the cross beam or the movable vertical rod, each of the hanging members for mounting a calibration element, and the calibration element for calibrating an advanced assistant driver system of a vehicle;
    wherein outside of the movable vertical rod is formed with a guiding groove extending along the length direction of the fixed vertical rod;
    the fixed vertical rod is formed with a guiding projection therein;
    the guiding projection cooperates with the guiding groove for guiding the movable vertical rod to move relative to the fixed vertical rod along the length direction of the fixed vertical rod.

2. The calibration bracket according to claim 1, wherein the number of the guiding grooves is plural and the number of the guiding projections is plural, each of the guiding grooves cooperating with one corresponding guiding projection to space the outside of the movable vertical rod from the inside of the fixed vertical rod.

3. The calibration bracket according to claim 1, wherein the brake member is fixed to one of the guiding projection and the guiding groove and abuts the other of the guiding projection and the guiding groove.

4. The calibration bracket according to claim 1, wherein the brake member is fixed to one of the outside of the movable vertical rod and the inside of the fixed vertical rod and abuts the other of the outside of the movable vertical rod and the inside of the fixed vertical rod.

5. The calibration bracket according to claim 1, wherein the calibration bracket further comprises a first mounting seat and a second mounting seat, both the first mounting seat and the second mounting seat being mounted to the movable vertical rod, and a position of the first mounting seat being higher than that of the second mounting seat;
    when the movable vertical rod moves relative to the fixed vertical rod along the length direction of the fixed vertical rod, the movable vertical rod drives the first mounting seat and the second mounting seat to move together;
    the cross beam is detachably mounted to one of the first mounting seat and the second mounting seat for mounting to the movable vertical rod.

6. The calibration bracket according to claim 5, wherein the first mounting seat comprises a first hanging plate portion for hitching the cross beam to secure the cross beam to the first mounting seat; and/or
    the second mounting seat comprises a second hanging plate portion for hitching the cross beam to secure the cross beam to the second mounting seat.

7. The calibration bracket according to claim 5, wherein the first mounting seat is mounted to a top end of the movable vertical rod and exposed outside the fixed vertical rod;
    the second mounting seat is located outside the fixed vertical rod, and the second mounting seat is connected to the first mounting seat via a connecting structure so as to indirectly mount the second mounting seat to the movable vertical rod.

8. The calibration bracket according to claim 7, wherein the connecting structure comprises a connecting rod extending along the length direction of the fixed vertical rod, the top end of the connecting rod being connected to the first mounting seat and a bottom end of the connecting rod being connected to the second mounting seat, and the second mounting seat being sleeved outside the fixed vertical rod.

9. The calibration bracket according to claim 5, wherein an idler pulley assembly is mounted inside the second mounting seat, the idler pulley assembly comprising an idler pulley rotatable relative to the second mounting seat, and the idler pulley abutting the outside of the fixed vertical rod;
    when the second mounting seat moves relative to the fixed vertical rod along the length direction of the fixed vertical rod, the idler pulley rotates relative to the second mounting seat.

10. The calibration bracket according to claim 9, wherein the number of idler pulley assemblies is plural so as to space the inside of the second mounting seat from the outside of the fixed vertical rod.

11. The calibration bracket according to claim 10, wherein the number of the idler pulley assemblies is four, four idler pulley assemblies being evenly distributed on two opposite sides of the inside of the second mounting seat.

12. The calibration bracket according to claim 9, wherein the outside of the fixed vertical rod is formed with a guiding wheel groove extending along the length direction of the fixed vertical rod, the idler pulley abutting the outside of the fixed vertical rod through the guiding wheel groove.

13. The calibration bracket according to claim 9, wherein a mounting wheel groove is formed inside the second mounting seat, the idler pulley assembly being mounted to the mounting wheel groove such that a portion of the idler pulley is received in the mounting wheel groove and the other portion of the idler pulley is exposed outside the mounting wheel groove and abuts the outside of the fixed vertical rod.

14. The calibration bracket according to claim 9, wherein the idler pulley assembly further comprises a bolt, a bearing, a retainer ring, a sleeve, and a support seat;
the idler pulley is sleeved outside an outer ring of the bearing, a stud of the bolt successively passes through an inner ring of the bearing, the sleeve, and the support seat and is threaded fit with the support seat, a head of the bolt abuts one side of the bearing, the retainer ring is sleeved in the idler pulley and abuts the other side of the bearing, and the sleeve abuts between the bearing and the support seat.

15. The calibration bracket according to claim 8, wherein the second mounting seat comprises a second hanging plate portion, a first support plate, and a second support plate;
the first support plate is opposite to the second hanging plate portion, and the second hanging plate portion is used for hitching the cross beam;
the number of the second support plates is two, and two second support plates are opposite to each other and are connected between the first support plate and the second hanging plate portion to form one sleeve portion for sleeving the fixed vertical rod.

16. The calibration bracket according to claim 8, wherein the brake member is fixed to one of the inside of the second mounting seat and the outside of the fixed vertical rod, and abuts the other of the inside of the second mounting seat and the outside of the fixed vertical rod.

17. The calibration bracket according to claim 5, wherein the guiding groove is formed on outside the fixed vertical rod, the guiding groove extends along the length direction of the fixed vertical rod and is adapted to the shape of the brake member, and the guiding groove cooperates with the brake member for guiding the second mounting seat to move relative to the fixed vertical rod along the length direction of the fixed vertical rod.

18. The calibration bracket according to claim 17, wherein the shape of the guiding groove is adapted to that of the brake member.

19. A calibration system, comprising a calibration element and a calibration bracket, the calibration element being mountable to the calibration bracket, wherein the calibration bracket comprises:
a base;
a fixed vertical rod, one end thereof being mounted to the base;
a movable vertical rod mounted to the fixed vertical rod, wherein the movable vertical rod is configured to move relative to the fixed vertical rod along a length direction of the fixed vertical rod;
a brake member for providing a friction force for driving the movable vertical rod to be fixed relative to the fixed vertical rod along the length direction of the fixed vertical rod;
a cross beam mounted to the movable vertical rod, when the movable vertical rod moves along the length direction of the fixed vertical rod relative to the fixed vertical rod, the cross beam is driven to move together; and
one or more hanging members mounted to the cross beam or the movable vertical rod, each of the hanging members for mounting a calibration element, and the calibration element for calibrating an advanced assistant driver system of a vehicle;
wherein outside of the movable vertical rod is formed with a guiding groove extending along the length direction of the fixed vertical rod;
the fixed vertical rod is formed with a guiding projection therein;
the guiding projection cooperates with the guiding groove for guiding the movable vertical rod to move relative to the fixed vertical rod along the length direction of the fixed vertical rod.

* * * * *